United States Patent
Ichishi et al.

(10) Patent No.: US 7,246,656 B2
(45) Date of Patent: Jul. 24, 2007

(54) VEHICLE AIR CONDITIONER

(75) Inventors: Yoshinori Ichishi, Kariya (JP); Tatsuya Ito, Obu (JP); Tatsumi Kumada, Gamagori (JP)

(73) Assignee: DENSO Corporation, Kariya (JP)

( * ) Notice: Subject to any disclaimer, the term of this patent is extended or adjusted under 35 U.S.C. 154(b) by 452 days.

(21) Appl. No.: 10/694,132

(22) Filed: Oct. 27, 2003

(65) Prior Publication Data

US 2004/0089005 A1    May 13, 2004

(30) Foreign Application Priority Data

Oct. 30, 2002  (JP)  ............................ 2002-315889
Aug. 29, 2003  (JP)  ............................ 2003-307359
Sep. 1, 2003  (JP)  ............................ 2003-308624

(51) Int. Cl.
*B60H 1/00*    (2006.01)

(52) U.S. Cl. ........................ 165/202; 165/42; 165/43; 236/91 C; 236/49.3; 250/338.1; 374/121; 374/141; 374/132

(58) Field of Classification Search ............... 236/49.3, 236/51, 91 C; 374/121, 141, 132; 165/11.1, 165/202, 42, 43; 250/338.1
See application file for complete search history.

(56) References Cited

U.S. PATENT DOCUMENTS 5,518,176 A  *  5/1996  Turner et al. .............. 236/49.3
5,531,377 A  *  7/1996  Thayer et al. ............. 236/49.3
6,155,492 A  *  12/2000  Hinterwaller et al. ......... 236/51
6,397,615 B1    6/2002  Kawai et al.
6,659,358 B2 *  12/2003  Kamiya et al. ........... 236/91 C
6,828,560 B2 *  12/2004  Lambert et al. ............ 250/353
6,997,605 B2 *   2/2006  Trapp et al. ................ 374/172
2002/0053601 A1  5/2002  Kamiya et al.
2002/0110178 A1* 8/2002  Puranen et al. ............. 374/121
2003/0157881 A1* 8/2003  Goupil et al. ............... 454/158

FOREIGN PATENT DOCUMENTS

| JP | 63255116 A | * | 10/1988 |
| JP | 2001097019 A | * | 4/2001 |
| JP | 2001347816 A | * | 12/2001 |
| JP | 2001349786 A | * | 12/2001 |

* cited by examiner

*Primary Examiner*—John K. Ford
(74) *Attorney, Agent, or Firm*—Harness, Dickey & Pierce, PLC

(57) ABSTRACT

A vehicle air conditioner has an IR sensor that detects a temperature of air inside a vehicle compartment. The IR sensor is disposed on an instrument panel so that the sensor is disposed above switches and a face blowout port on the instrument panel. Accordingly, a detecting range of the IR sensor is prevented from interfering by hands of a driver or an occupant even when the switches are operated by the driver. Thus, the air conditioner is capable of stable air conditioning.

9 Claims, 20 Drawing Sheets

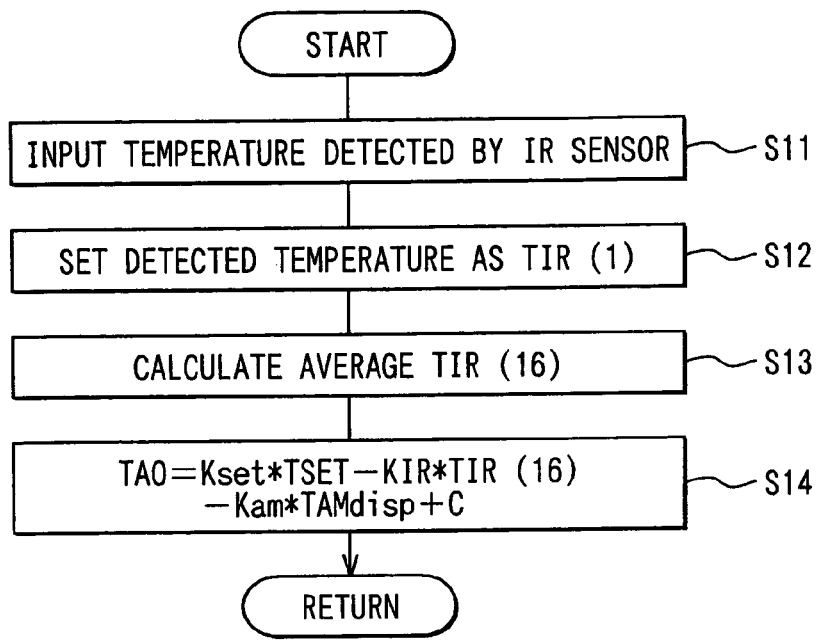
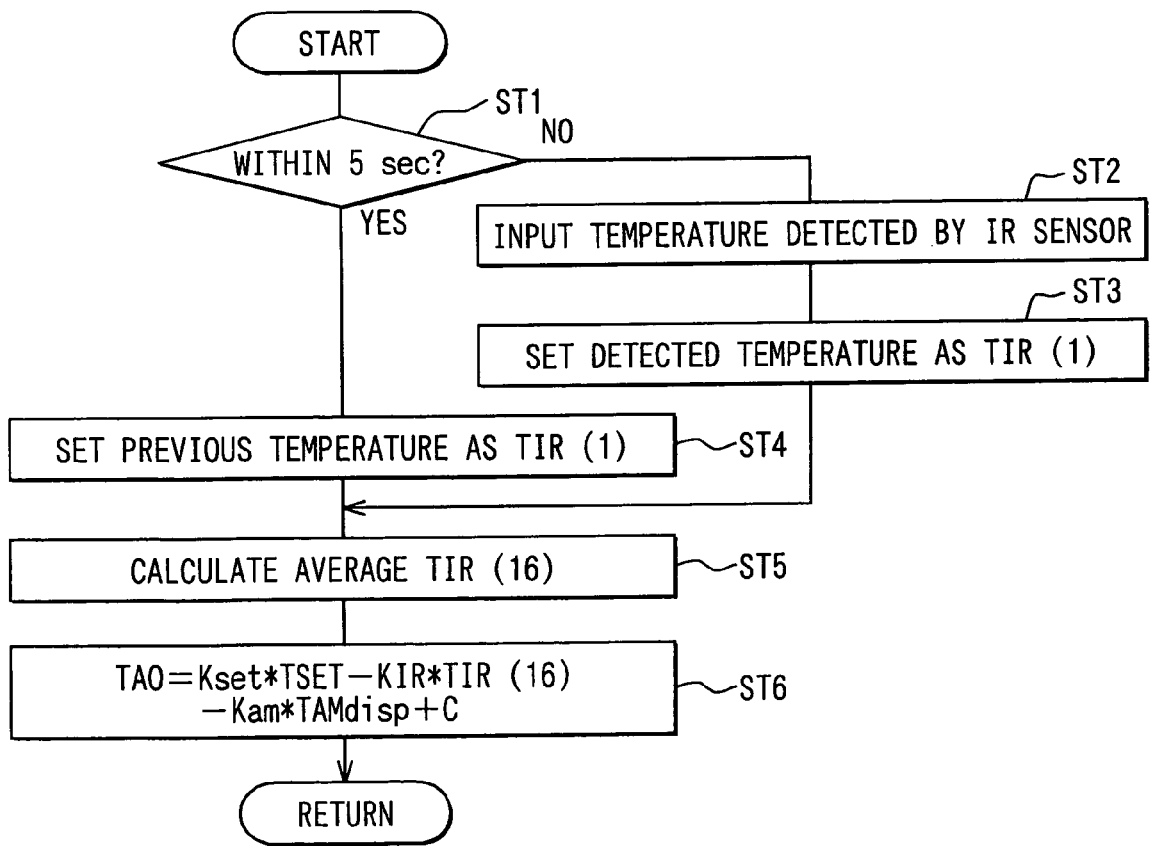

VEHICLE AIR CONDITIONER

CROSS REFERENCE TO RELATED APPLICATION

This application is based on Japanese Patent Applications No. 2002-315889 filed on Oct. 30, 2002, No. 2003-307359 filed on Aug. 29, 2003, and No. 2003-308624 filed on Sep. 1, 2003, the contents of which are incorporated herein by reference.

BACKGROUND OF THE INVENTION

1. Field of the Invention

The present invention relates to a vehicle air conditioner that is automatically controlled based on a temperature of the air detected by a non-contact temperature sensor.

2. Description of Related Art

US-2002-0053601A1 discloses an air conditioner for a vehicle. The air conditioner has an infrared temperature sensor, a controller, and a switch. The infrared temperature sensor is disposed in a center of an instrument panel of the vehicle. The sensor detects a temperature around a driver and occupants of a vehicle compartment. The controller controls the air conditioner based on the detected temperature. The switch is disposed on the instrument panel to be operated by the driver and the occupants.

U.S. Pat. No. 6,397,615 discloses another air conditioner for a vehicle. The air conditioner has a thermopile-type infrared temperature sensor, an air conditioning unit, and an electronic controller. The sensor detects the temperature around the driver and the occupants. The air conditioning unit controls the temperature and the air volume of conditioned air. The conditioned air is discharged from a blowout port that is disposed on a facing plate of a vehicle compartment (e.g., front surface of the instrument panel). The controller controls the air conditioning unit based on the temperature detected by the infrared temperature sensor.

In such air conditioners, as shown in FIG. 7, when the switch on the instrument panel is operated by the driver and the occupants, a detecting range 70b of the infrared sensor is interfered with hands of the driver and the occupants. This is because the infrared sensor (non-contact sensor) is disposed in the center of the instrument panel. In such an air conditioner, the infrared sensor fails to detect the temperature around the driver and the occupants accurately. As a result, the air conditioner cannot control conditioned air comfortably.

In addition, when the thermopile-type infrared temperature sensor is disposed under the blowout port, the sensor is affected by cooled air blowing from the blowout port. This is because the cooled air comes down from the blowout port while the air conditioner operates in a cooling mode.

In general, a thermopile-type infrared temperature sensor includes a can-like case, an infrared-absorbing film, and a thermocouple. The can-like case has a window. The infrared-absorbing film is disposed in the case. The film absorbs incident infrared rays through the window and transforms them into heat.

The heat causes temperature difference between a hot side junction and a cold side junction of the thermocouple. The temperature difference causes thermo-electromotive force between the junctions.

Namely, the incident infrared rays from the temperature-detecting range in the vehicle causes temperature difference between the hot and cold junctions of the thermopile. The temperature difference causes thermo-electromotive force or an electric potential difference from which the temperature of the temperature-detecting range is determined.

However, the sensor is affected by the cooled air, so that an uneven distribution of the temperature occurs in the can-like case. Due to the uneven distribution of the temperature in the can-like case, the temperature difference occurs. As a result, the air conditioning in the vehicle is disturbed.

SUMMARY OF THE INVENTION

It is an object of the present invention to provide an air conditioner for a vehicle that is capable of a stable air conditioning even when a driver or an occupant in a vehicle operates a switch on an instrument panel.

It is another object of the present invention to provide a temperature detector that has a non-contact temperature sensor, a temperature-sensing window of which is not easily soiled, and is capable of sensing the temperature around the driver and the occupant accurately.

It is still another object of the present invention to provide an air conditioner that controls air in a vehicle appropriately by through the use of a non-contact temperature sensor.

According to one aspect of the present invention, a vehicle air conditioner has a non-contact temperature sensor that is disposed on the instrument panel, above a switch for setting a temperature and an air volume inside a vehicle compartment.

If a hand of a driver or an occupant in a passenger seat of the vehicle covers a temperature-detecting range of the non-contact temperature sensor, the temperature sensor fails to detect the temperature of or around the driver and the occupants, disenabling stable air conditioning. The non-contact temperature sensor of the air conditioner of the present invention is disposed above the switches for setting the temperature and air volume inside the vehicle compartment. Accordingly, a detecting range of the non-contact temperature sensor is prevented from interfering by hands of the driver or the occupant in the passenger seat even when he or she operates the switch for setting the temperature or the air volume at his or her option. Thus, the air conditioner is capable of stable air conditioning.

In addition, because the non-contact temperature sensor of the air conditioner of the present invention is fitted on the instrument panel of a vehicle, such instrument panels with non-contact temperature sensors can conveniently be delivered as a module to vehicle manufacturers, contributing to the reduction of their assembling costs. Besides, since the non-contact temperature sensor can be disposed near the microcomputer of the controller of the air conditioner, the connecting wire between them can be short. This increases a noise resistance of the temperature sensor, and the stability of air conditioning. This also contributes to cost reduction.

According to another aspect of the present invention, a vehicle air conditioner has an air-conditioning unit, a non-contact temperature sensor, and a control unit. The air-conditioning unit conditions the air inside a vehicle compartment, and the conditioned air is blown into the vehicle compartment through a blowout port. The non-contact temperature sensor detects the temperature within a temperature-detecting range. The control unit controls the temperature of the conditioned air in response to the detected temperature detected by the non-contact temperature sensor. The non-contact temperature sensor is disposed above the blowout port.

Because the non-contact temperature sensor is not affected with the conditioned air flowing out of the blowout port, it is capable of measuring the temperature within the temperature-detecting range as accurate. Therefore, the air conditioner is capable of conditioning the air in the vehicle compartment desirably.

According to still another aspect of the present invention, a vehicle air conditioner has an air-conditioning unit, a non-contact temperature sensor, and a control unit. The air-conditioning unit conditions the air inside a vehicle compartment, and the conditioned air is blown into the vehicle compartment through a blowout port. The non-contact temperature sensor detects the temperature within a temperature-detecting range. The control unit controls the temperature of the conditioned air in response to the detected temperature detected by the non-contact temperature sensor. The non-contact temperature sensor is disposed at one side of the blowout port in a horizontal direction.

Accordingly, the non-contact temperature sensor is not affected with the conditioned air even when the conditioned air is blown sideways from the blowout port. Therefore, it is capable of measuring the temperature of the air within the temperature-detecting range as accurate. Thus, the air conditioner is capable of conditioning the air in the vehicle compartment desirably.

BRIEF DESCRIPTION OF THE DRAWINGS

The above and other objects, features and advantages of the present invention will become more apparent from the following detailed description made with reference to the accompanying drawings. In the drawings:

FIG. 8 is a flowchart of calculating the TAO according to the first embodiment;

FIG. 10 is a flowchart of calculating a TAO according to the second embodiment;

DETAILED DESCRIPTION OF PREFERRED EMBODIMENTS

Figure 1A:
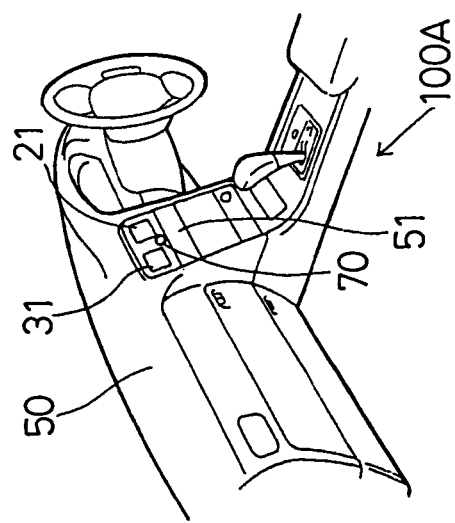
FIG. 1A is a perspective view of an instrument panel of a vehicle equipped with an automatic air conditioner according to a first embodiment of the present invention.

The preferred embodiments of the present invention will be explained with reference to the accompanying drawings. In the drawing, the same numerals are used for the same components and devices.

First Embodiment

An automatic air conditioner 100A according to a first embodiment of the present invention will be explained by referring to FIGS. 1A to 8. As shown in FIG. 1A, the automatic air conditioner 100A is provided in a vehicle. The air conditioner 100A conditions the air in a vehicle compartment of the vehicle. The vehicle has an engine for driving the vehicle.

Figure 2:
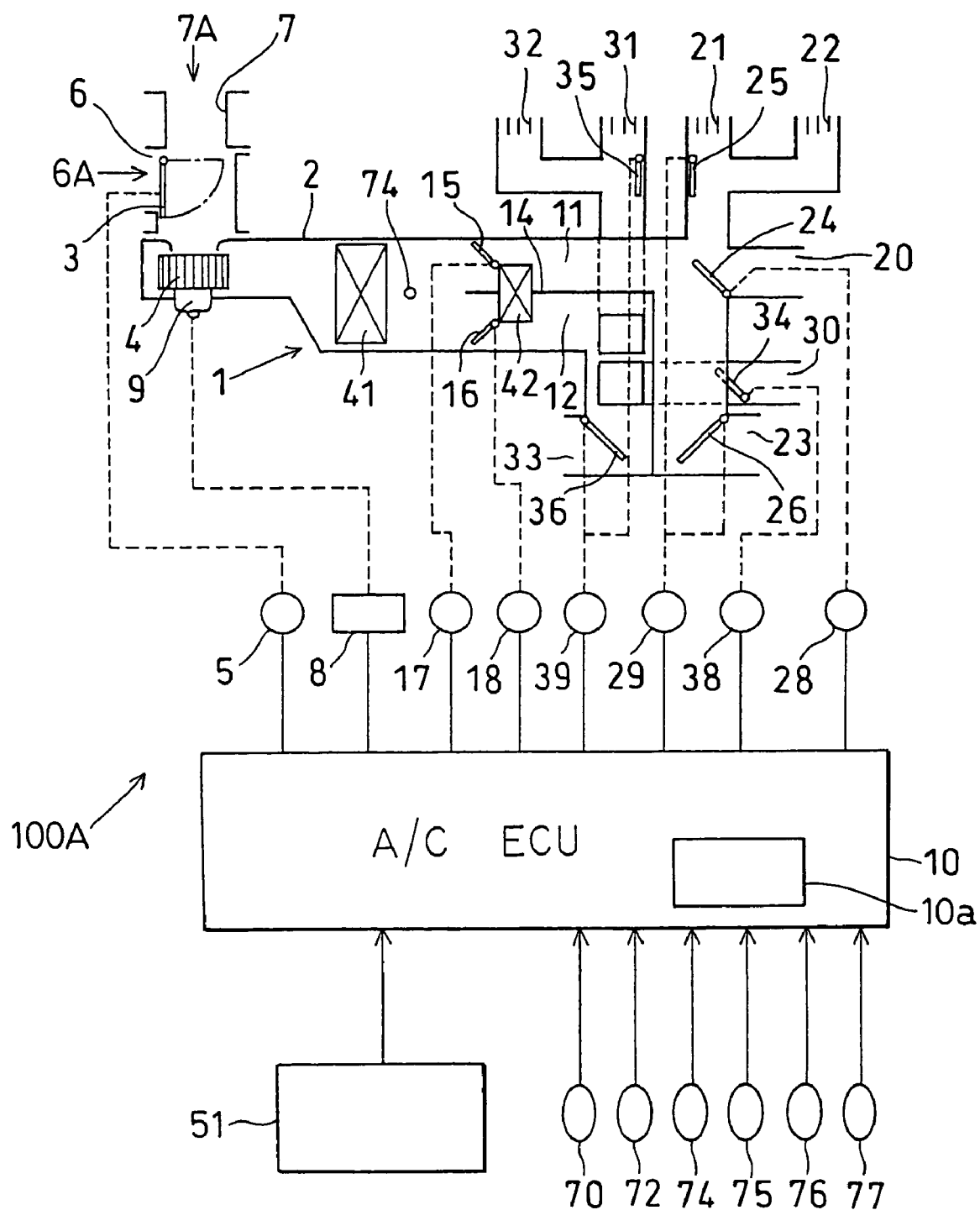
FIG. 2 is a schematic illustration of the whole configuration of the automatic air conditioner according to the first embodiment.

As shown in FIG. 2, the automatic air conditioner 100A has an air conditioning unit 1 and an air conditioner electrical control unit (A/C ECU) 10. The ECU 10 controls actuators for the air conditioning unit 1.

The vehicle compartment has a driver side air conditioning zone and a passenger side air conditioning zone. The driver side air conditioning zone includes a rear seat on the right side of the vehicle. The passenger side air conditioning zone includes a rear seat on the left side of the vehicle. The air conditioning unit 1 controls a temperature of the air blowing to the vehicle compartment and a blowout port mode. The air conditioning unit 1 controls the temperature of the air and the blowout port mode of the driver side and passenger side of the conditioning zones separately.

The air conditioning unit 1 has an air duct 2 disposed at a front of the vehicle compartment. An inside/outside air switching door 3 and a blower 4 are provided upstream in the air duct 2. The inside/outside air switching door 3 is driven by an actuator, such as a servomotor 5, to change a suction port mode. That is, the inside/outside air switching door 3 changes an opening of an inside air suction port 6 and an external air suction port 7. Inside air is suctioned through the inside air suction port 6. Outside air is suctioned through the outside air suction port 7.

The blower 4 is a centrifugal fan, which is driven by a blower motor 9. The blower motor 9 is controlled by a blower driving circuit 8. The blower 4 generates an airflow, which flows toward the inside of the vehicle compartment, within the air duct 2.

An evaporator 41 is provided in the middle of the air duct 2 to cool the air flowing through the air duct 2. A heater core 42 is provided downstream of the evaporator 41. The heater 42 heats the air, with the heat of the cooling water of the engine, flowing through a first passage 11 and a second passage 12.

A part of the air duct 2 is divided by a partition 14 into a first passage 11 and a second passage 12. The evaporator 41 may be replaced by a Peltier element if the automatic air conditioner 100A is applied to electric vehicles.

A driver side air mix door 15 and a passenger side air mix door 16 are provided immediately upstream of the heater core 42. The air mix doors 15, 16 separately control the temperatures of the driver side air conditioning zone and the passenger side air conditioning zone, respectively.

The air mix doors 15, 16 are driven by their respective actuators, such as servomotors 17, 18. The air mix doors 15, 16 adjust the temperature of the conditioned air flowing toward the driver side air conditioning zone and the passenger side air conditioning zone, respectively. Especially, the conditioned air is flowed toward an inner surface of a windshield of the vehicle.

The evaporator 41 is a constituent part of a cooling cycle. The cooling cycle has a compressor (not shown), a condenser (not shown), a receiver (not shown), an expansion valve (not shown), and the evaporator 41. The compressor is driven by the engine of the vehicle to compress and discharge a coolant. The condenser condenses the coolant discharged from the compressor into a partially gaseous, partially liquid coolant. The receiver separates liquid coolant from the two-phase coolant. The expansion valve lets the liquid coolant expand adiabatically. The evaporator 41 lets the partially gaseous, partially liquid two-phase coolant evaporate.

The compressor is intermittently driven by an electromagnetic clutch (not shown), which is provided between the engine and the compressor and is controlled by the ECU 10.

When the clutch is turned on, the compressor starts. Then, the evaporator 41 cools and dehumidifies the air flowing through the air duct 2. Accordingly, the temperature in the vehicle compartment lowers, and mist, if any, on the inner surfaces of the windows is cleared.

The compressor is a variable-capacity compressor with an electromagnetic capacity-control valve. The valve regulates the capacity of the compressor according to a control signal that is generated based on the result of comparison between a target evaporator outlet temperature TEO behind the evaporator 41 and the air temperature TE measured by a post-evaporator air temperature sensor 74 disposed behind the evaporator 41.

A driver side defroster blowout port 20, a driver side center face blowout port 21, a side face blowout port 22 for the driver side, and a driver side foot blowout port 23 are provided downstream ends of each blowout duct. The blowout ducts are connected to the tail end of the first passage 11.

A passenger side defroster blowout port 30, a passenger side center face blowout port 31, a side face blowout port 32 for the passenger side, and a passenger side foot blowout port 33 are provided downstream ends of each blowout duct. The blowout ducts are connected to the tail end of the second passage 12.

The defroster blowout ports 20 and 30 blow conditioned air (mainly, hot air) to the windshield. The side face blowout ports 22 and 32 blow conditioned air (mainly, hot air) to the side windows.

Blowout port switching doors 24, 25, 26 are provided in the first passage 11 to change the blowout port mode for the driver side air conditioning zone. Blowout port switching doors 34, 35, 36 are provided in the second passage 12 to change the blowout port mode for the passenger side air conditioning zone.

The blowout port switching doors 24 to 26 and 34 to 36 are driven by actuators, such as servomotors 28, 29, 38, and 39. The blowout port switching doors 24 to 26 and 34 to 36 change the blowout port modes for the driver side and the passenger side, respectively.

The blowout port modes for each of the driver side and the passenger side include a FACE mode, a B/L mode, a FOOT mode, a F/D mode, a DEF mode, and other modes, respectively.

The blowout port switching doors 24 and 34 open and close the defroster blowout ports 20 and 30, respectively, separately.

The ECU 10 begins arithmetic processing and control processing when an ignition switch of the engine is turned on (IG ON) and a DC power is supplied from the battery (not shown) of the vehicle to the ECU 10.

The automatic air conditioner 100A is provided with a control panel 51, which is installed into an installation hole on the instrument panel 50 of the vehicle. Various signals are inputted from switches on the control panel 51 into the ECU 10.

Figure 1B:
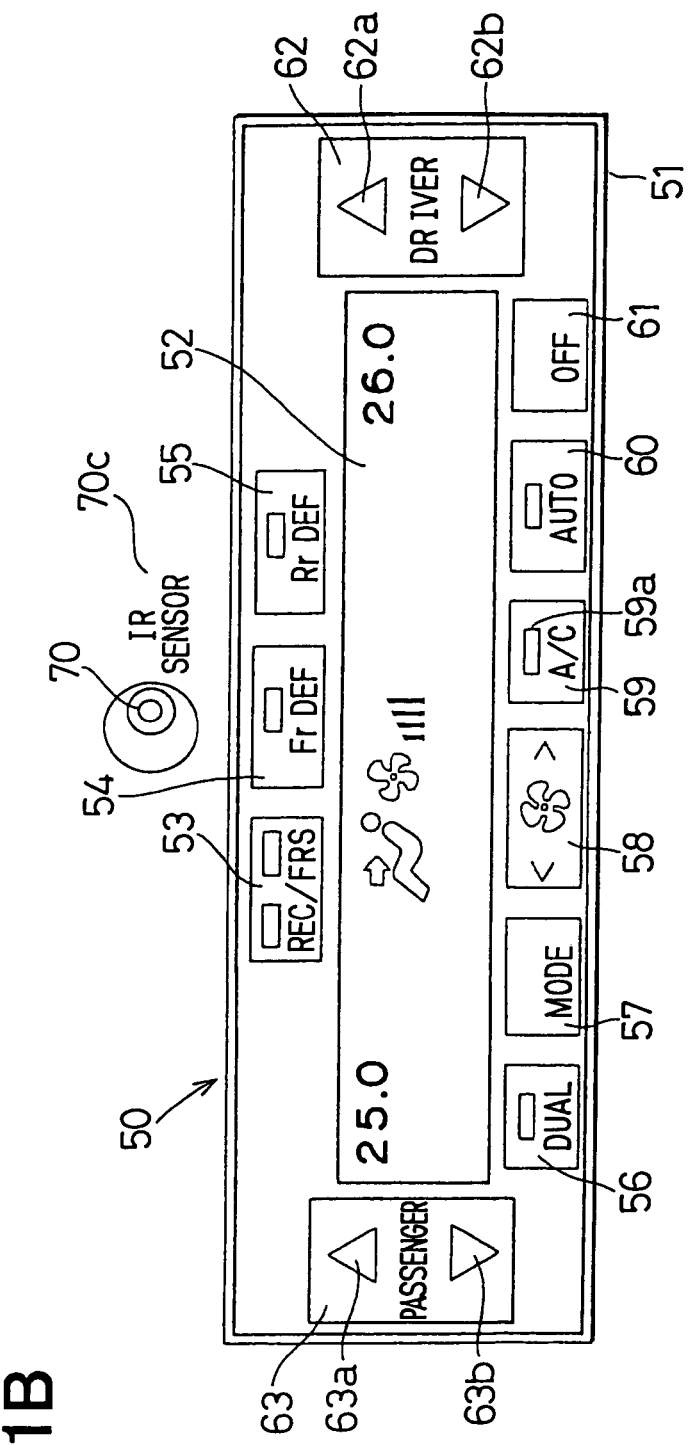
FIG. 1B is a front view of a control panel for the automatic air conditioner according to the first embodiment.

As shown in FIG. 1B, the control panel 51 has a liquid crystal display (LCD) 52, a REC/FRS switch 53 for switching between the inside air and the outside air, a Fr DEF switch 54 for the front defroster, and a Rr DEF switch 55 for the rear defroster. The control panel 51 has a DUAL switch 56, a MODE switch 57 for the changeover of the blowout port mode, a blower switch 58 for changing the air volume, an A/C switch 59, an AUTO switch 60, and an OFF switch 61. The control panel 51 also has a DRIVER switch 62 for setting the temperature of the driver side of the vehicle compartment, a PASSENGER switch 63 for setting the temperature of the passenger seat side of the vehicle compartment, and so on.

The DUAL switch 56 enables the temperature setting of the driver side and that of the passenger seat side separately from each other.

The Fr DEF switch 54 is to command whether to raise the demisting power or not and put the blowout port mode into the DEF mode.

The MODE switch 57 changes the blowout port mode among the FACE mode, the B/L mode, the FOOT mode, and the F/D mode in response to an operation of the driver and the passenger.

The LCD 52 has an area for indicating the set temperature of the driver side air conditioning zone and the passenger side air conditioning zone, an area for indicating the blowout port mode with an icon, an area for graphically indicating the air volume, and so on. The LCD 52 may also indicate an outside temperature outside the vehicle, the suction mode, time, and so on. Besides, the above switches may be replaced by touch switches arranged on the LCD 52.

The A/C switch 59 turns on and off the cooling cycle (the compressor). When it is pushed to turn the compressor off, the cooling cycle is turned off and the engine gets rid of the air conditioning load. This increases a fuel efficiency of the vehicle. When the A/C switch 59 is once pushed, the cooling cycle is turned on and its LED 59*a* turns on. When the A/C switch 59 is pushed again, the cooing cycle is turned off and its LED 59*a* turns off.

When the blower switch 58 (the switch for changing the air volume) is put in an off state of the blower switch 58 or the OFF switch 61 is pushed, the A/C switch 59 and its LED 59*a* go off to stop the compressor.

The DRIVER switch 62 has an up switch 62*a* and a down switch 62*b*. The DRIVER switch 62 sets the temperature of the driver side air conditioning zone at a desired level.

The PASSENGER switch 63 has an up switch 63*a* and a down switch 63*b*. The PASSENGER switch 63 sets the temperature of the passenger side air conditioning zone at a desired level.

The ECU 10 has a CPU, a memory 10*a*, I/O ports, and so on. The memory 10*a* has a ROM (EEPROM), and a RAM. Analog signals from various sensors are inputted into the ECU 10 through the I/O ports. The analog signals are converted into digital signals by an A/D converter, and inputted into the CPU. Specifically, a non-contact infrared temperature sensor (IR sensor) 70 and an outside air temperature sensor 72 are electrically connected to the ECU 10. The IR sensor 70 senses the temperature of or around the driver and occupants. The outside air temperature sensor 72 senses the temperature outside the vehicle.

As shown in FIG. 1B, the IR sensor 70, which also serves as a sensor for sensing the temperature inside the vehicle, is disposed on the instrument panel 50. Specifically, the IR sensor 70 is disposed on ceiling side, namely, above the switches 62, 63, and 58 as described in detail later. There is a sign of "IR SENSOR" on a right side of the IR sensor 70 to indicate its existence.

Figure 3:
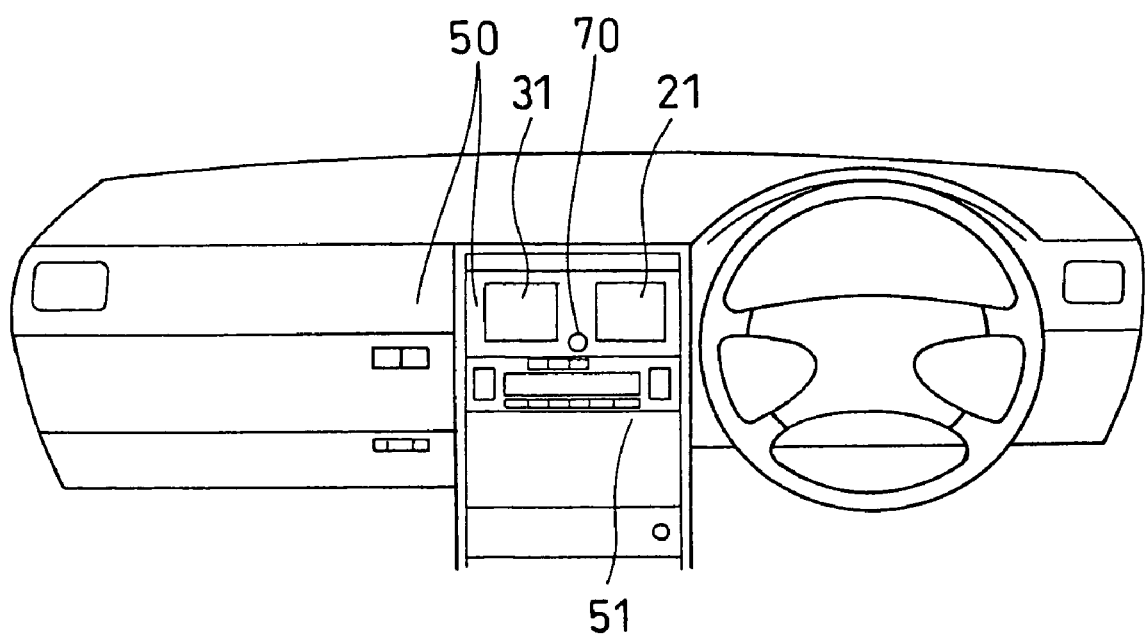
FIG. 3 is a front view of the instrument panel according to the first embodiment.
Figure 13:
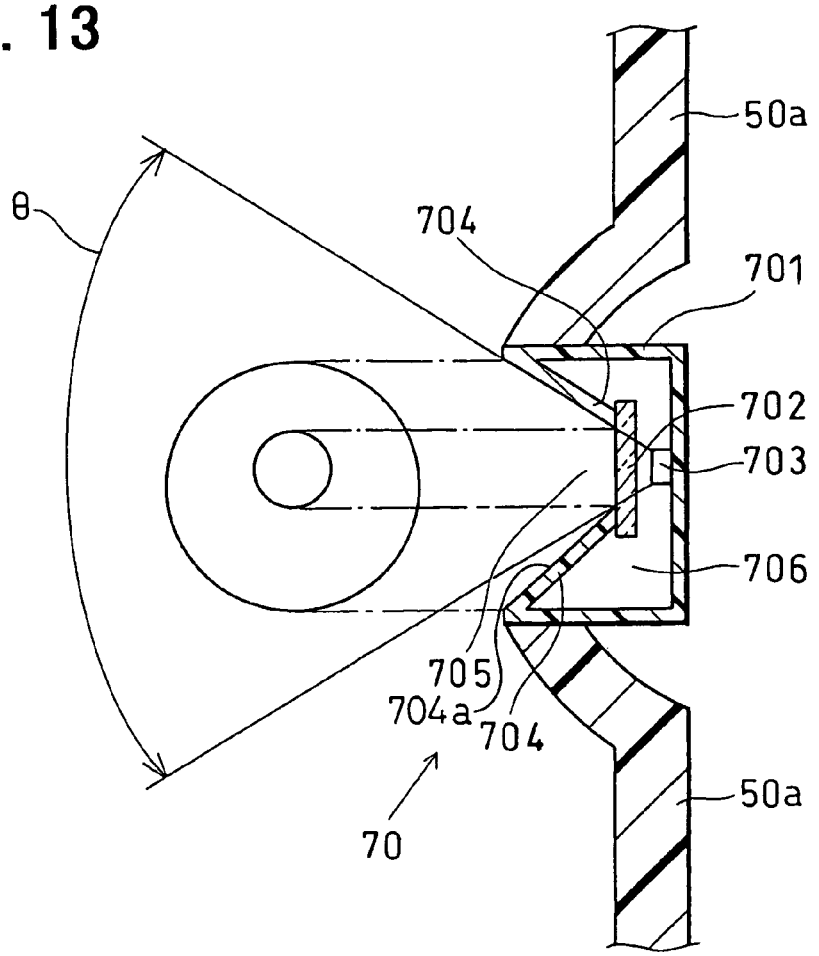
FIG. 13 is a sectional view of the instrument panel around the IR sensor, and a front view of the IR sensor according to the first embodiment.

As shown in FIG. 13, the IR sensor 70 of FIGS. 1 and 3 is put in a hole 705 made in a synthetic-resin facing plate 50*a* of the instrument panel 50. The IR sensor 70 has a synthetic-resin case 701, a permeable film 702, and an infrared-detecting element 703. The permeable film 702 functions as a lens and filter. The permeable film 702 and the infrared-detecting element 703 are put in the inner space 706 of the synthetic-resin case 701.

The front plate of the synthetic-resin case 701 has an oblique surface (slope) 704, which has a truncated cone shape. The permeable film 702 is disposed at the bottom of a bowl-shaped front plate 704. A symbol "θ" is the angle of the sensing range of the IR sensor 70. The incident infrared rays from the surfaces of objects in the sensing range penetrate the permeable film 702 and reach the infrared-detecting element 703.

Because of the truncated cone shape of the front plate 704, a foreign material, such as dust, fallen on a bottom surface 704*a* of the front plate 704 slides and falls off the front plate 704. Thus, dust does not collect on the front plate 704 to block off the incident infrared rays.

Besides, because the IR sensor 70 is put in the inner part of the hole 705 of the synthetic-resin facing plate 50*a* so that its angle θ of the sensing range is not disturbed, the driver and the occupants are effectively prevented from touching the permeable film 702. Thus, the permeable film 702 is effectively prevented from being soiled.

Namely, with respect to the installation of the IR sensor 70, the IR sensor 70 has at least the infrared-detecting element 703 and the permeable film 702, and the permeable film 702 is put in the inner part of the hole 705. The IR sensor 70 measures infrared rays from the occupants and windows in the vehicle compartment to measure surface temperatures of the objects in the vehicle compartment.

Because the IR sensor 70 is put in the inner part of the hole 705, the IR sensor 70 is not soiled by fingers and so on. Because the front plate 704 of the hole 705 has the truncated cone shape, the foreign material slides and falls off the slope of the truncated cone shaped front plate 704. Thus, foreign materials fallen on the bottom surface 704*a* of the front plate 704 are not collected on it. It is desirable to form the front plate 704 in the truncated cone shape so that the angle of the temperature-detecting range θ can be secured.

Referring back to FIG. 2, the ECU 10 is also electrically connected to the post-evaporator air temperature sensor 74, a water temperature sensor 75, a hygrometric sensor 76, and a vehicle speed sensor. The temperature sensor 74 detects the temperature of the air behind the evaporator 41. The water temperature sensor 75 detects the temperature of cooling water of the engine. The hygrometric sensor 76 detects a relative humidity of the air in the vehicle compartment. The hygrometric sensor 76 is disposed in a recess portion. The recess portion is disposed in the instrument panel 50 in the vicinity of the driver seat. The vehicle speed sensor detects a speed of the vehicle.

The outside air temperature sensor 72, the post-evaporator air temperature sensor 74, and the water temperature sensor 75 are provided with temperature-detecting elements such as thermisters.

The ECU 10 is electrically connected to a pressure sensor 77. The pressure sensor 77 detects a pressure of the coolant on the high-pressure side of the cooling cycle. The pressure sensor 77 is disposed between the receiver and the expansion valve.

Referring to FIGS. 4 to 8, the operation of the automatic air conditioner 100A will be explained.

When the ignition switch of the engine is turned on, DC power is supplied to the ECU 10. The CPU operates according to a control program as shown in FIG. 4 stored in the ROM.

Figure 4:
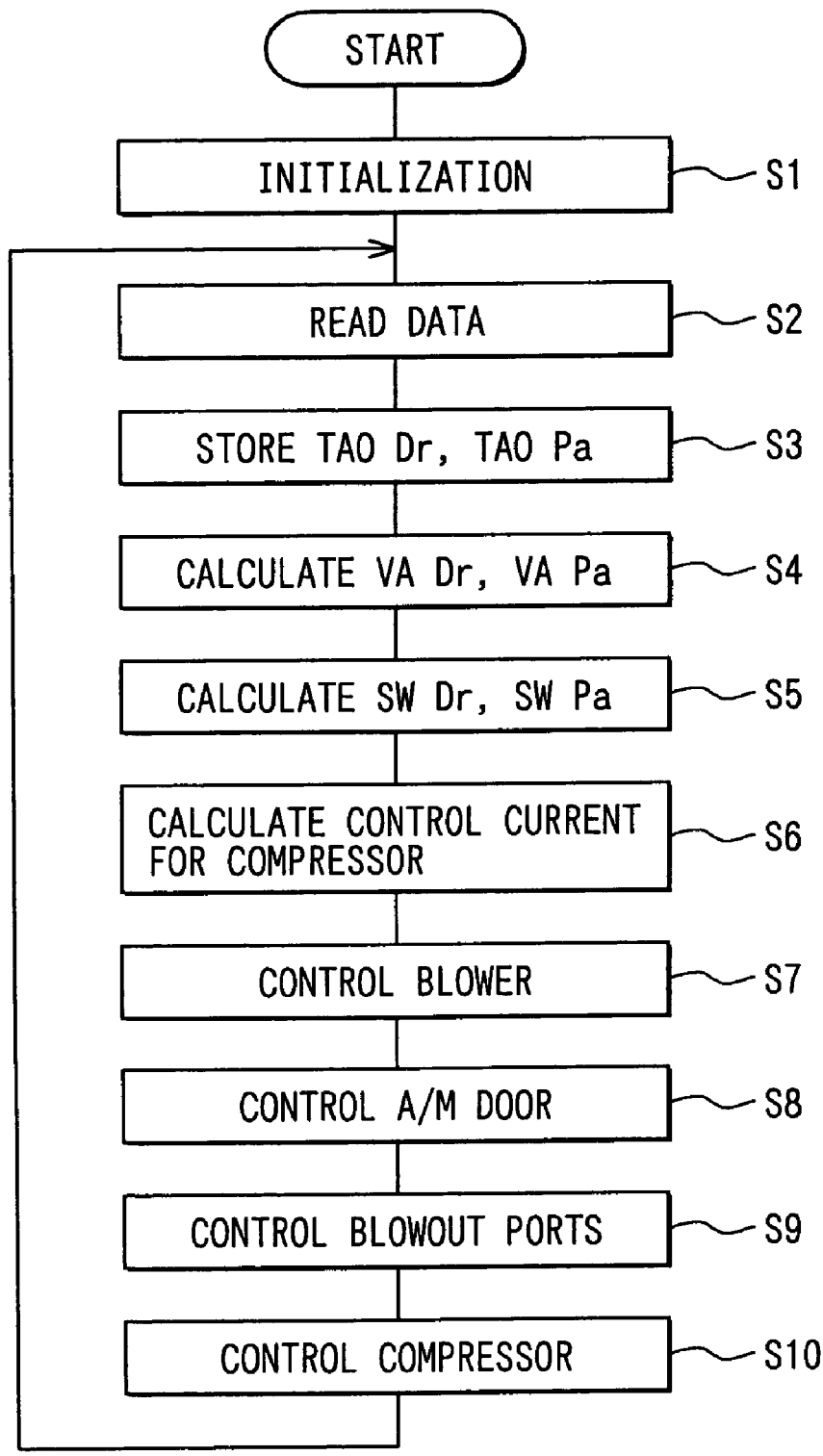
FIG. 4 is a flowchart of a control program carried out by an ECU of the air conditioner according to the first embodiment.

In step S1 of FIG. 4, the RAM of the ECU 10, which is a memory for data processing, is initialized.

In step S2, signals from the switches of the control panel 51 and data (detected values) are read into the RAM.

The data, read into the RAM, includes a post-evaporator air temperature value TE, a water temperature value TW, and an average value TIR (16).

An analog signal outputted from the temperature sensor 74 for sensing the temperature of air behind the evaporator 41 is converted into a digital signal with analog-to-digital (A/D) conversion. The digital signal is then converted into the post-evaporator air temperature value TE, which is stored in the RAM.

An analog signal outputted from the water temperature sensor 75 for sensing the temperature of cooling water of the engine is converted into a digital signal with A/D conversion. Then, the digital signal is converted into the water temperature value TW, which is stored in the RAM.

The average temperature TIR (16) around the driver and the occupants is calculated in Step S13 of FIG. 8.

A processing of steps S11 to S14 of FIG. 8 is carried out while the processing of Steps S1 to S10 of FIG. 4 is carried out.

In step S11 of FIG. 8, the value of temperature around the driver and the occupants detected by the IR sensor 70 is inputted into the RAM every 250 ms.

In step S12, the temperature values of step S11 are set as TIR (1).

In step S13, the average temperature value TIR (16) of 16 temperature values TIR is calculated.

In step S14, target blowout temperatures TAODr and TAOPa are calculated by using below equations #1 and #2. The TAODr is the target blowout temperature of the conditioned air blown into the driver side air conditioning zone. The TAOPa is the target blowout temperature of the conditioned air blown into the passenger side air conditioning zone.

$$TAODr = Kset \times TSETDr - KIR \times TIR(16) - Kam \times TAM\text{-}disp + C \quad (\#1)$$

$$TAOPa = Kset \times TSETPa - KIR \times TIR(16) - Kam \times TAM\text{-}disp + C \quad (\#2)$$

In the equations, "TSETDr" is the set temperature on the driver side air conditioning zone. "TSETPa" is the set temperature on the passenger seat side air conditioning zone. The coefficient for set temperature "Kset" is 7.0. The coefficient for IR "KIR" is 5.1. "TIR" (° C.) is the detected value by the IR sensor. The coefficient for air temperature outside the vehicle "Kam" is 1.0. "TAMdisp" (° C.) is the air temperature outside the vehicle. The correction constant "C" is −45.

Referring back to FIG. 4, in step S3, the target blowout temperatures TAODr and TAOPa calculated in step S14 of FIG. 8 are stored in the RAM.

In step S4, a blower rate (air volume per unit time) of the blower 4 (the blower control voltages VADr and VAPa to be applied to the motor 9 of the blower 4) are calculated based on the TAODr and TAOPa.

More specifically, the blower control voltage VA to be applied to the motor 9 of the blower 4 is calculated as follows.

Figure 5:
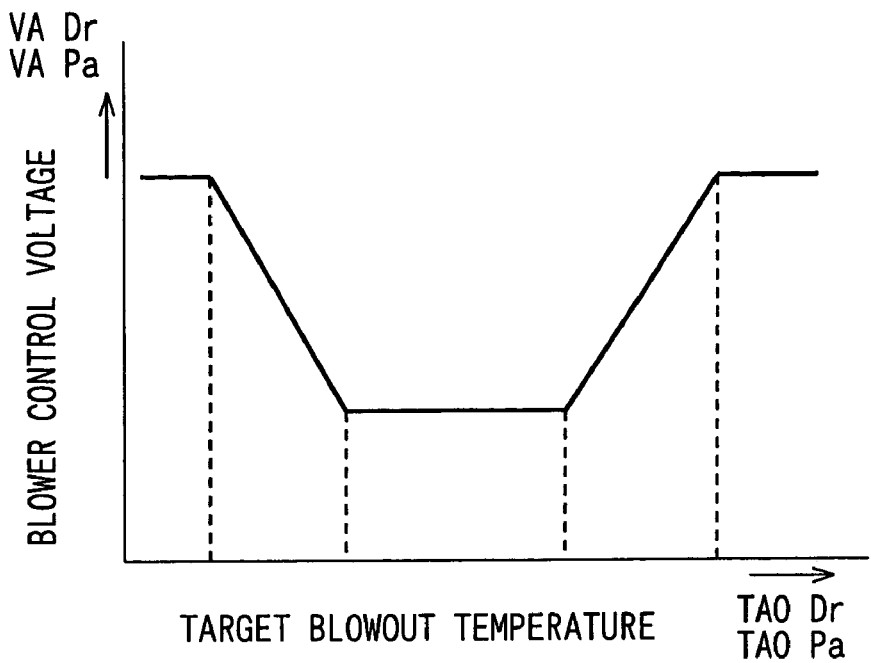
FIG. 5 is a characteristic graph showing a relation between a target blowout temperature (TAO) and a blower control voltage of the automatic air conditioner according to the first embodiment.

The blower control voltages VADr and VAPa corresponding to TAODr and TAOPa are determined based on the characteristic graph of FIG. 5. Then, the blower control voltages VADr and VAPa are averaged.

In step S5, an opening degree SWDr (%) of the driver side air mix door 15, and an opening degree SWPa (%) of the passenger side air mix door 16 are calculated by using the equations #3 and #4, $$SWDr = \{TAODr - TE\} \times \{100/(TW - TE)\} \quad (\#3)$$

$$SWPa = \{TAOPa - TE\} \times \{100/(TW - TE)\} \quad (\#4)$$

where TAODr is the target blowout temperature on the driver side air conditioning zone, TAOPa is the target blowout temperature on the passenger side air conditioning zone, TE is the post-evaporator air temperature value detected by the post-evaporator air temperature sensor 74 for sensing the temperature of air behind the evaporator 41, and TW is the water temperature value detected by the water temperature sensor 75 for sensing the temperature of cooling water of the engine.

In step S6, a target discharge rate of the compressor is determined by a feedback control (PI control) so that post-evaporator air temperature TE is equal to the target evaporator outlet temperature TEO behind the evaporator 41.

More specifically, a solenoid current (control current $I_n$), which is the target value of a control current to be supplied to the solenoid of a capacity-control solenoid valve installed on the compressor, is calculated by using the equations #5 and #6.

$$E_n = TE - TEO \quad (\#5)$$

$$I_n = I_{n-1} - Kp\{(E_n - E_{n-1}) + (\theta/Ti) \times E_n\} \quad (\#6)$$

where TE is the actual post-evaporator air temperature detected by the post-evaporator air temperature 74, TEO is the target evaporator outlet temperature, Kp is a proportional constant (for example, 0.03), θ is a sampling time (for example, one second), Ti is an integration constant (for example, 1000), $E_n$ is a temperature deviation (° C.) of this time, $E_{n-1}$ is a temperature deviation (° C.) of a previous time, $I_n$ is a control current (A) of this time, $I_{n-1}$ is a control current (A) of the previous time.

In step S7, control signals are outputted to the blower driving circuit 8 to accomplish blower control voltages VADr and VAPa of step S4. In Step S8, control signals are outputted to the servomotors 17 and 18 to accomplish the opening degrees SWDr and SWPa of step S5.

Figure 6:
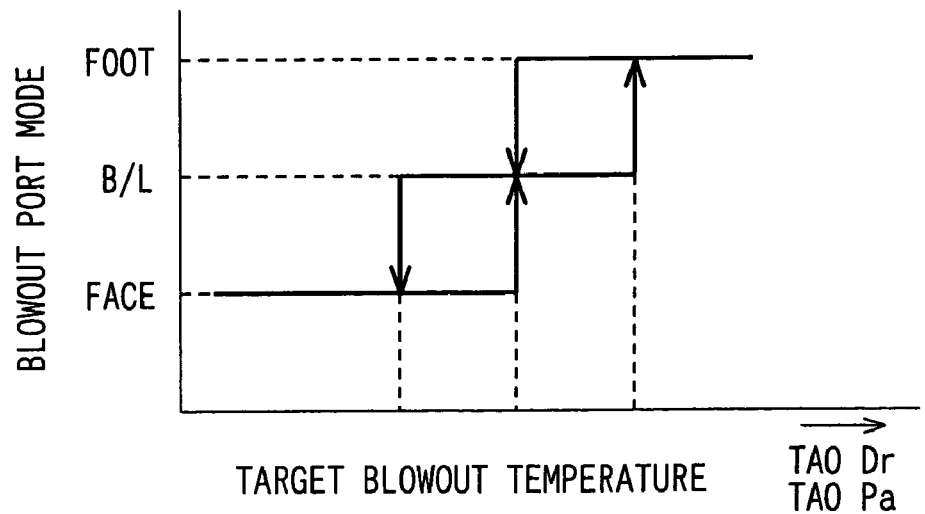
FIG. 6 is a characteristic graph showing a relation between the TAO and a blowout port mode of the automatic air conditioner according to the first embodiment.

In step S9, blowout port modes corresponding to TAODr and TAOPa are chosen based on the characteristic graph of FIG. 6 and outputted to the actuators 28, 29, 38, and 39.

In step S10, the solenoid current $I_n$ determined in Step S6 is outputted to the solenoid of the capacity-control solenoid valve installed on the compressor and the processing returns to step S2.

The advantages of the automatic air conditioner 100A of the present invention are now described.

(1) The IR sensor 70 is disposed above the DRIVER switch 62, the PASSENGER switch 63, and the blower switch 58 on the instrument panel 150.

Figure 7:
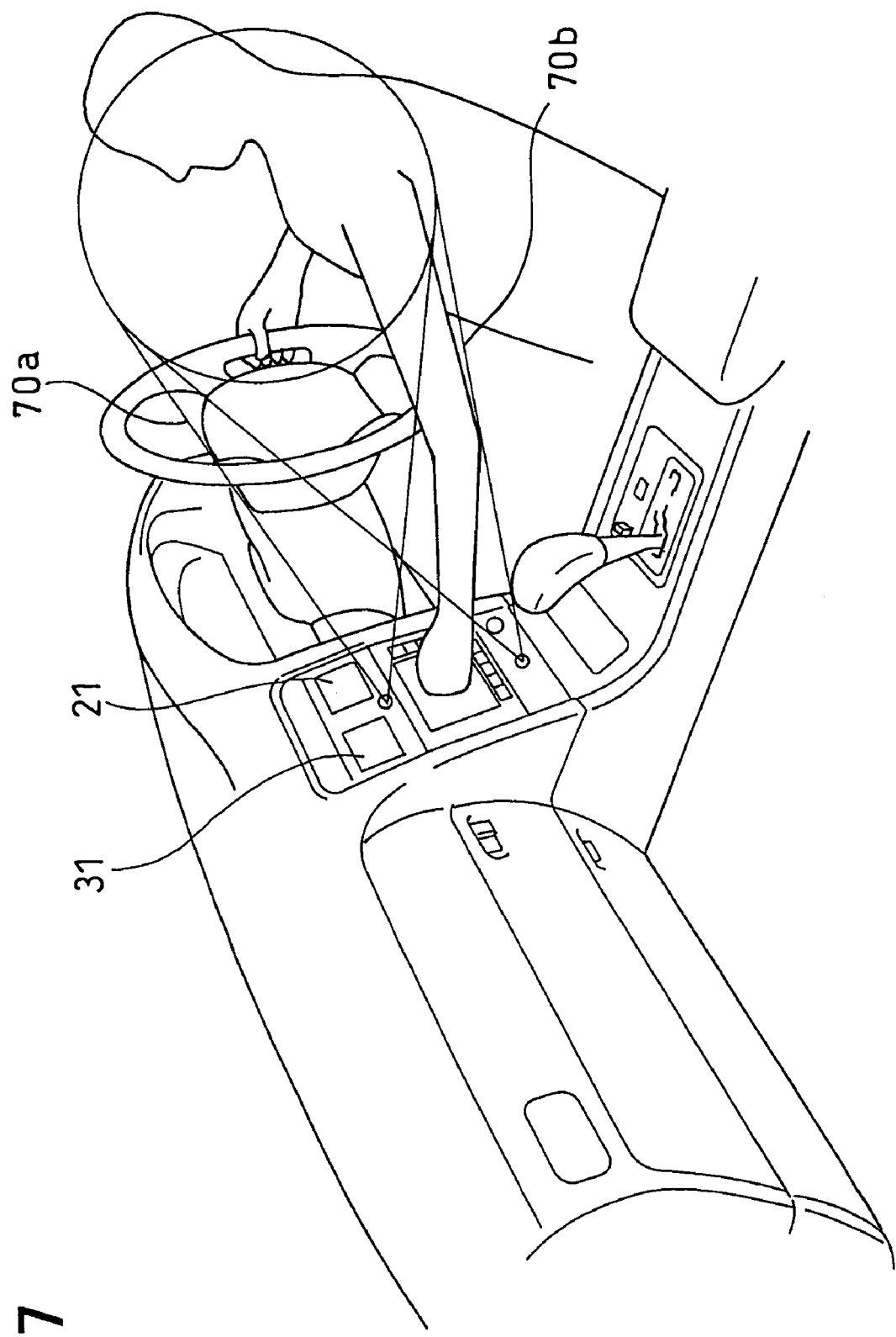
FIG. 7 is an illustration of temperature detecting ranges of the infrared (IR) sensors disposed at a different position.

Accordingly, when the driver or the occupant in the passenger seat operates the DRIVER switch 62 or the PASSENGER switch 63, his or her hand does not interfere with a temperature-detecting range 70a of the IR sensor 70 (see FIG. 7).

Therefore, the IR sensor 70 is capable of detecting the temperature of or around the driver and the occupants accurately, causing no air-volume hunting and enabling comfortable air conditioning.

(2) There is a sign of "IR SENSOR" on one side of the IR sensor 70 to indicate its existence.

Accordingly, the driver and the occupant in the passenger seat are warned not to interfere with the temperature-detecting range 70a during operating the DRIVER switch 62, the PASSENGER switch 63, and the blower switch 58. Therefore, their hands are prevented without fail from interfering with the temperature-detecting range 70a.

(3) Because the IR sensor 70 is fitted on the instrument panel 50, the instrument panel 50 with the IR sensor 70 can conveniently be delivered as a module to vehicle manufacturers, contributing to the reduction of their assembling costs. Besides, the IR sensor 70 is disposed near the microcomputer, the connecting wire between them is short, which increases the noise resistance of the sensor and, hence, the stability of air-conditioning and contributes to cost reduction.

Second Embodiment

Figure 9:
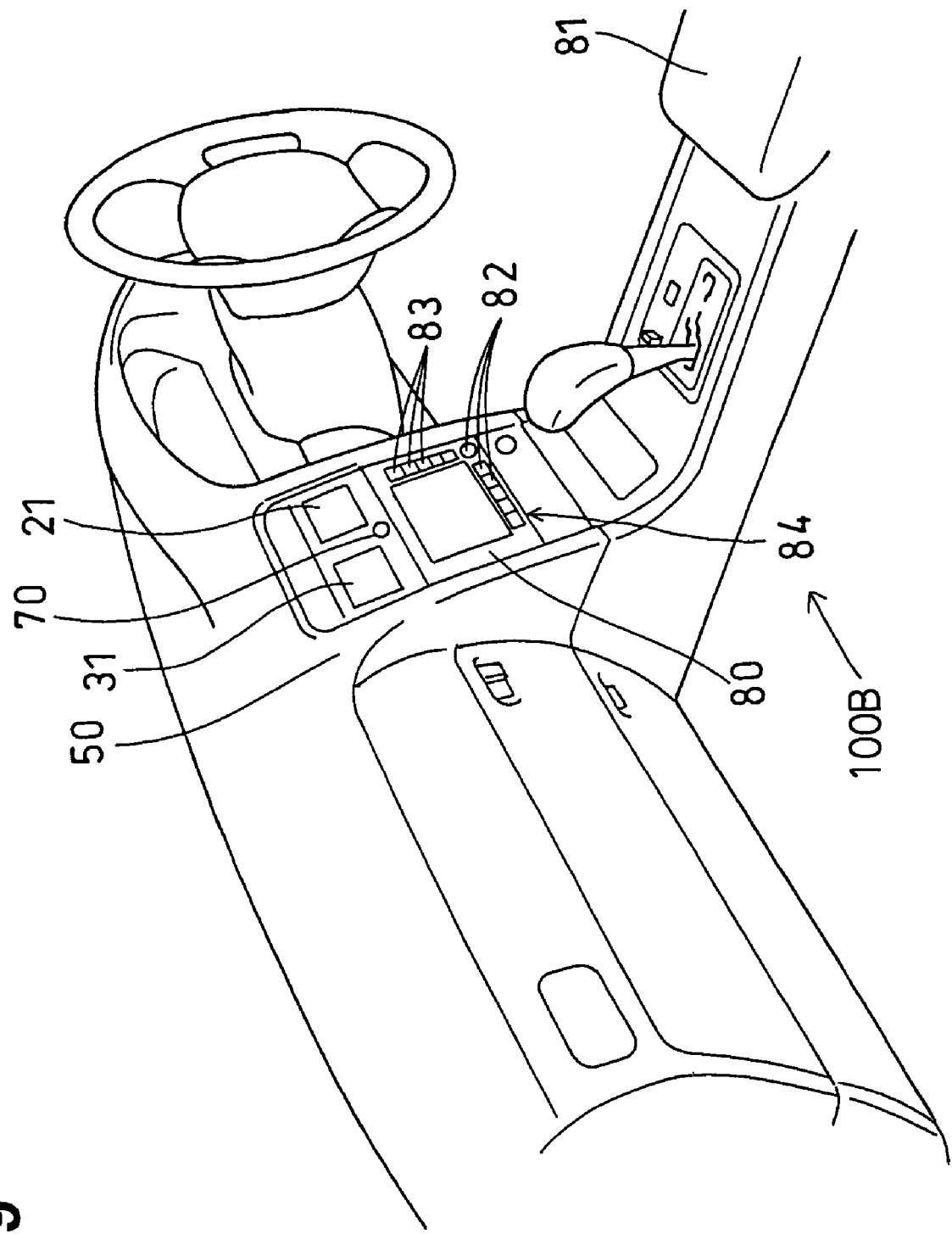
FIG. 9 is a perspective view of an instrument panel of a vehicle equipped with an automatic air conditioner according to a second embodiment of the present invention.

Referring to FIGS. 9 and 10, the automatic air conditioner 100B for vehicles of the second embodiment of the present invention is now described.

The basic configuration of the automatic air conditioner 100B is the same as that of the automatic air conditioner 100A. The control panel of the automatic air conditioner 100B is disposed in an armrest 81.

In the present embodiment, another control panel 80 is installed on the instrument panel 50. The control panel 80 has audio switches 82 and navigation switches 83 for an audio and navigation system 84. As described above, the switches for the air conditioning such as temperature-setting switches and an air volume-setting switch are disposed in the armrest 81 of the control panel 80.

The IR sensor 70 is disposed on the instrument panel 50, above the audio and navigation switches 82 and 83.

Referring to FIGS. 4 and 10, the operation of the automatic air conditioner 100B of the present embodiment is now described.

As shown in FIG. 4, when the ignition switch of the engine is turned on, DC power is supplied to the ECU 10. The CPU operates according to the control program (the flowchart of FIG. 4) stored in the ROM.

In step S1 of FIG. 4, the RAM of the ECU 10, which is a memory for data processing, is initialized.

In step S2, signals from the switches for air conditioning and data (detected values) described below are read into the RAM.

The data, read into the RAM, includes the post-evaporator air temperature value TE, the water temperature value TW, and the average value TIR (16).

An analog signal outputted from the temperature sensor 74 for sensing the temperature of air behind the evaporator 41 is converted into a digital signal with the A/D conversion. The digital signal is then converted into the post-evaporator air temperature value TE, which is then stored in the RAM.

An analog signal outputted from the water temperature sensor 75 for sensing the temperature of the cooling water of the engine is converted into a digital signal with A/D conversion. Then, the digital signal is converted into the temperature value TW, which is then stored in the RAM.

The average temperature TIR (16) around the driver and the occupants calculated in step ST5 of a flowchart in FIG. 10 is stored in the RAM.

A processing of steps ST1 to ST6 of FIG. 10 is carried out while the processing of steps S1 to S10 of FIG. 4 is carried out.

In step ST1 of FIG. 10, it is determined whether it is within five seconds from a detection of operation any of the audio and navigation switches 82 and 83. If it is not within five seconds of said detection of switch operation (NO), the processing advances to step ST2. If it is within five seconds of said detection of switch operation (NO), the processing advances to step ST4.

In step ST2, the value of temperature around the driver and the occupants detected by the IR sensor 70 is inputted into the RAM every 250 ms.

In step ST3, temperature values around the driver and the occupants are designated as TIR (1).

In step ST4, the temperature detected by the IR sensor 70 ten seconds before said detection of switch operation is retrieved from the RAM and designated as TIR (1). TIR (2) is the value detected by the IR sensor 70 ten seconds minus 250 ms before said detection of switch operation. TIR (3) is the value detected by the IR sensor 70 ten seconds minus 500 ms before said detection of switch operation.

In step ST5, the average temperature value TIR of 16 temperature values TIR at intervals of 250 ms is calculated as TIR (16).

In step ST6, the target blowout temperatures TAODr and TAOPa are calculated by using below equations #7 and #8. The TAODr is the target blowout temperature of the conditioned air blown into the driver side air conditioning zone. The TAOPa is the target blowout temperature of the conditioned air blown into the passenger side air conditioning zone.

$$TAODr = Kset \times TSETDr - KIR \times TIR(16) - Kam \times TAM\text{-}disp + C \quad (\#7)$$

$$TAOPa = Kset \times TESTPa - KIR \times TIR(16) - Kam \times TAM\text{-}disp + C \quad (\#8)$$

In the equations, "TSETDr" is the set temperature on the driver side air conditioning zone. "TSETPa" is the set temperature on the passenger seat side air conditioning zone. The coefficient for set temperature "Kset" is 7.0. The coefficient for IR "KIR" is 5.1. "TIR" (° C.) is the detected value by the IR sensor. The coefficient for air temperature outside the vehicle "Kam" is 1.0. "TAMdisp" (° C.) is the air temperature outside the vehicle. The correction constant "C" is −45.

Referring back to FIG. 4, in step S3, the target blowout temperatures TAODr and TAOPa calculated in step ST6 of FIG. 10 are stored in the RAM.

The processing in steps S4 to S10 of FIG. 4 in the case of the automatic air conditioner 100B is the same as the processing in steps S4 to S10 of FIG. 4 in the case of the automatic air conditioner 100A.

The automatic air conditioner 100B has not only the third advantages described in the first embodiment but also the following advantage.

(4) The IR sensor 70 is disposed on the instrument panel 50, which includes the audio and navigation switches 82 and 83. Accordingly, the driver and the occupant in the passenger seat can operate the audio and navigation switches 82 and 83 without interfering with the detecting range of the IR sensor 70. Therefore, the IR sensor 70 is capable of detecting the temperature of or around the driver and the occupants accurately, causing no air-volume hunting and enabling comfortable air conditioning.

Third Embodiment

Referring to FIGS. 2, 4, 8, 14A and 14B, a temperature detector 70E for the automatic air conditioner 100D according to the third embodiment of the present invention is now described.

Figure 14A:
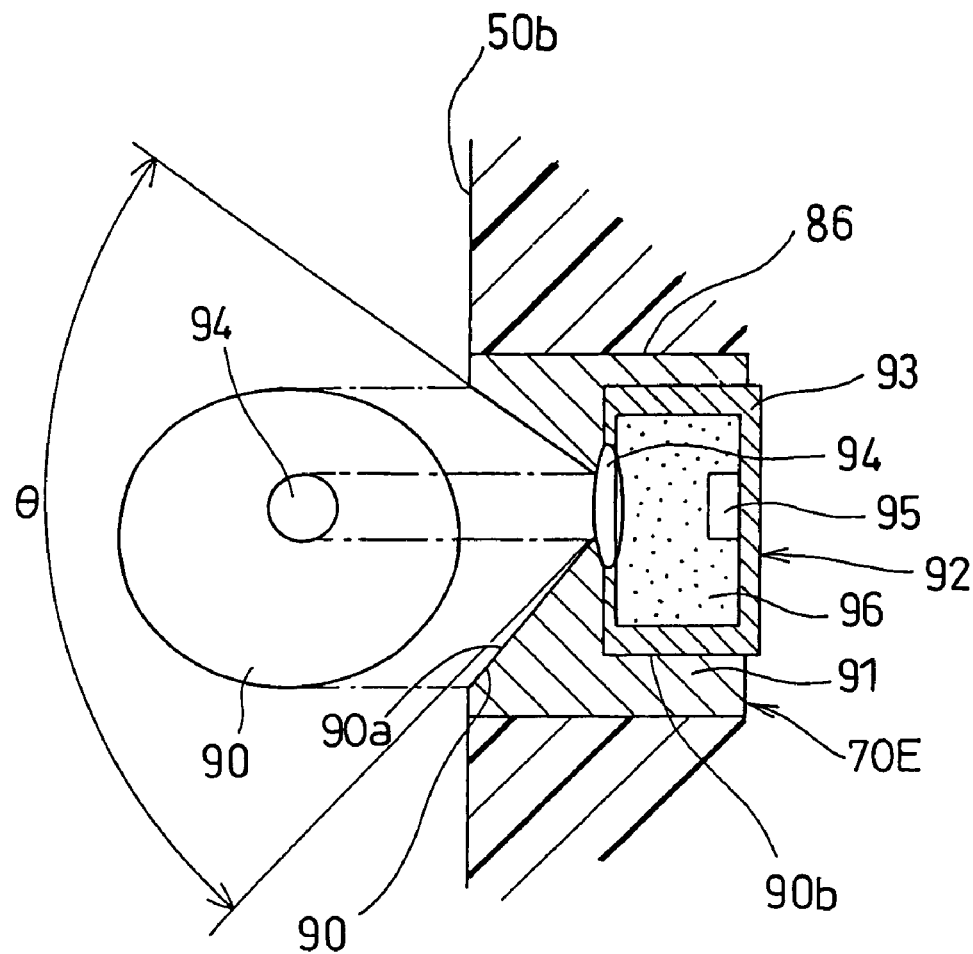
FIG. 14A is a sectional view of an instrument panel around another IR sensor, and a front view of the IR sensor according to a third embodiment of the present invention.
Figure 14B:
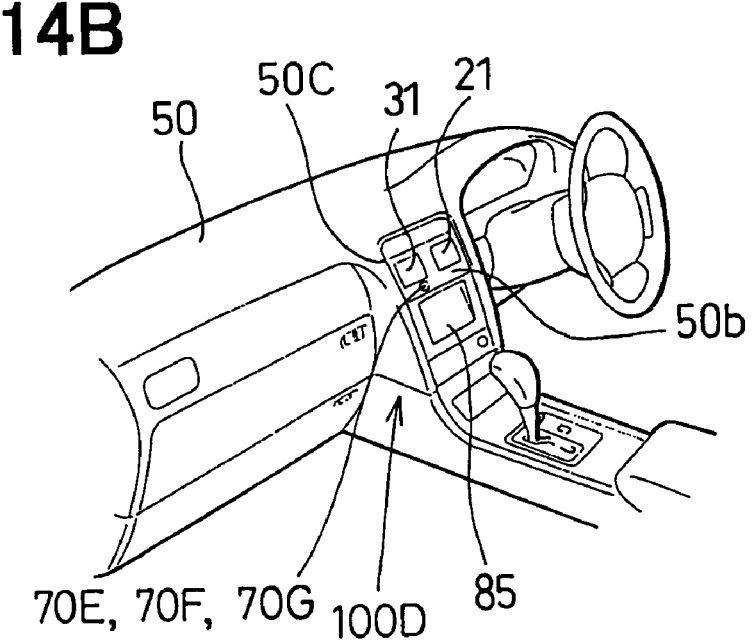
FIG. 14B is a perspective view of the instrument panel equipped with an automatic air conditioner according to the third embodiment.

The automatic air conditioner 100D of the present embodiment shown in FIG. 14B has the same configuration as the automatic air conditioner 100A of the first embodiment (see FIG. 2) except that the control panel 51 is replaced by an LCD (liquid crystal display) control panel 85 with touch switches. The LCD control panel 85 is used for the operation of not only the automatic air conditioner 100D but also audio and navigation systems.

The ECU 10 of the automatic air conditioner 100D calculates the target blowout temperatures TAODr and TAOPa based on the temperature around the driver and the occupants detected by the temperature detector 70E (see FIG. 8). The ECU 10 controls the air-conditioning actuators based on the target blowout temperatures TAODr and TAOPa (see FIG. 4).

As shown in FIG. 14A, the temperature detector 70E has a cover (made of zinc alloy) 91 and a non-contact temperature sensor 92. The temperature detector 70E is disposed in a hole 86, which is provided in a plastic facing plate 50b of the instrument panel 50 of the vehicle. The hole 86 is positioned above the LCD control panel 85, a little off the centerline of the vehicle compartment toward the passenger seat. The hole 86 is a through hole with rectangular openings.

The cover 91 is in the shape of a block and has a truncated cone shape recess 90 in its front and another recess 90b in its back. The recesses 90 and 90b communicates with each other. The non-contact temperature sensor 92 is disposed in the back recess 90b.

The facing plate 50b is a part of the instrument panel 50 (made of ABS plastic). The facing plate 50b is fitted into an opening 50c, which is provided in the instrument panel 50.

The non-contact temperature sensor 92 has a plastic case 93, a temperature-sensing window 94, and an IR sensor element 95. The temperature-sensing window 94 is made in the front of the case 93 and provided with silicon lens with a germanium coat that functions as a filter. The IR sensor element 95 including a thermocouple is disposed in the inner part of the case 93. The case 93 is filled with an inert gas (nitrogen) 96.

The front recess 90 has a truncated cone shape. The truncated cone shape front recess 90 is opened toward the driver and the occupants. A bottom surface 90a in a front surface of the recess 90 slopes down. The temperature-sensing window 94 is positioned at the bottom of the front recess 90. Thus, the angle θ of detecting range of 90° is secured.

The automatic air conditioner 100D of the third embodiment has the following advantages.

(5) Because the temperature detector 70E is disposed above the LCD control panel 85 for the operation of the automatic air conditioner 100D, the audio, and navigation systems. As a result, the hand of the driver or the occupant in the passenger seat having access to the LCD control panel 85 does not interfere with the detecting range of the temperature detector 70E.

Therefore, the temperature detector 70E is capable of detecting the temperature of or around the driver and the occupants accurately, causing no air-volume hunting and enabling comfortable air conditioning.

(6) Because the temperature-sensing window 94 of the non-contact temperature sensor 92 is disposed at the bottom of the truncated cone shape recess 90, the fingers and other parts of the driver and the occupants are prevented from touching the temperature-sensing window 94. As a result, the temperature-sensing window 94 is not easily soiled by oil and dirt of the fingers. Accordingly, the temperature detector 70E is capable of detecting the temperature of or around the driver and the occupants as accurate.

Figure 18:
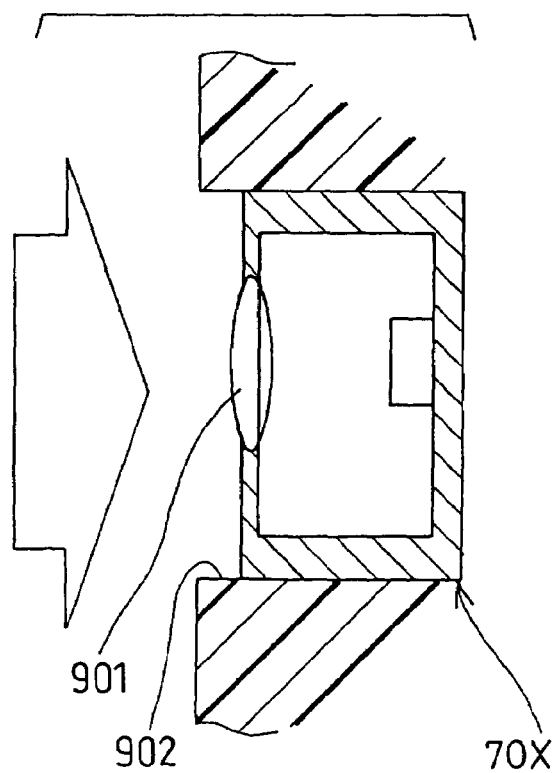
FIG. 18 is a sectional view of an instrument panel around a sensor according to a comparative example.

On the other hand, in case that the temperature detector 70X does not have the truncated cone shape front recess as shown in FIG. 18, the fingers of the driver and the occupant in the passenger seat easily touch the lens surface 901. Hence, the lens surface 901 is liable to be soiled by oil and dirt of the finger. The lens surface 901 is liable to be smeared by detergent for the cleaning of the interior of the vehicle compartment including the instrument panel, too. If the lens surface 901 is soiled, the accuracy of the temperature detector 70X is reduced.

(7) Because the front recess 90 of the cover 91 is in the shape of the truncated cone and its bottom surface slopes down toward the vehicle compartment, dust entered the truncated cone shape front recess 90 slides on and falls off its slope of the bottom surface 90a without collecting in it. Thus, the temperature-detection by the temperature detector 70E is not disturbed with such dust.

On the other hand, as in the case of the temperature detector 70X, which does not have a bottom surface sloping down toward the vehicle compartment as shown in FIG. 18, dust collects easily in the cylindrical recess 902.

(8) Because the front recess 90 of the cover 91 is in the shape of a truncated cone that is opened toward the driver and the occupants, the angle θ of the detecting range of the non-contact temperature sensor 92 is as large as 90°. Further, since the recess 90 is opened toward the driver and the occupants in the vehicle compartment, the temperature detector is capable of detecting the temperature of or around the driver and the occupants accurately.

(9) Because the temperature-sensing window 94 is disposed at the bottom of the truncated cone shape front recess 90 and the non-contact temperature sensor 92 is put in the back recess 90b, the IR sensor element 95 requires no means (such as coating) for shutting out infrared rays other than incident infrared rays through the temperature-sensing window 94. This enables the reduction of production cost of the temperature detector 70E.

(10) Heat, around the driver and the occupant, is collected by the silicon lens of the temperature-sensing window 94. The heat is efficiently sent to the IR sensor element 95. Besides, the germanium coat on the lens of the temperature-sensing window 94 cuts out heat and light rays of a certain wavelength range, which are detrimental to the IR sensor element 95.

(11) Because the truncated cone shape front recess 90 in front of the cover 91 can be produced in advance, it can be made easily. Besides, because the truncated cone shape recess 90 is made in the cover 91 of the temperature detector 70E, the temperature detector 70E can be easily installed by just fitting the non-contact temperature sensor 92 into the back recess 90b of the cover 91.

Fourth Embodiment

Figure 15:
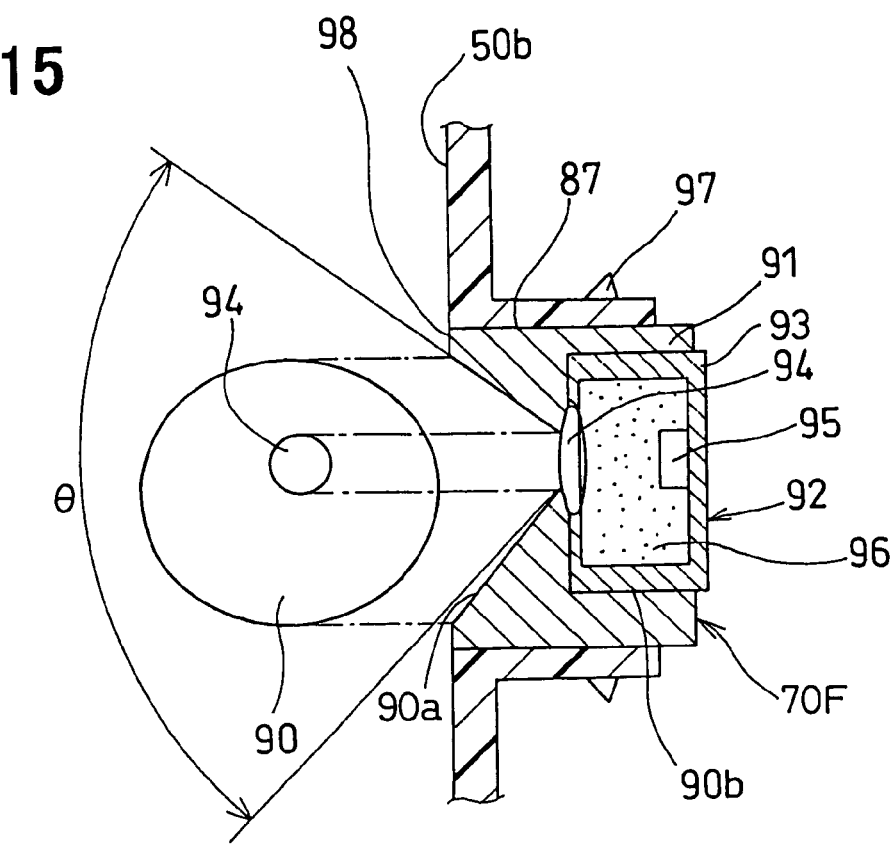
FIG. 15 is a sectional view of an instrument panel around another IR sensor, and a front view of the IR sensor according to a fourth embodiment of the present invention.

Referring to FIG. 15, the temperature detector 70F of the fourth embodiment of the present invention is now described.

The temperature detector 70F has a cover (made of zinc alloy) 91 having a truncated cone shape recess 90 in its front, and a non-contact temperature sensor 92. The detector 70F is put in a hole 87, which is provided in a facing plate 50b of the instrument panel of a vehicle. The non-contact temperature sensor 92 of the temperature detector 70F has the same construction as the non-contact temperature sensor 92 of the temperature detector 70E.

The cover 91 is in the shape of a block and has a truncated cone shape recess 90 in its front and another recess 90b in its back. The recesses 90 and 90b communicates with each other. The non-contact temperature sensor 92 is put in the back recess 90b. Protrusions 97 are formed on the top, bottom, and right and left sides of the cover 91.

The plastic facing plate 50b is fitted into an opening 50c provided in the instrument panel 50 as shown in FIG. 14B. The hole 87 is formed in the plastic facing plate 50b and has a cylindrical shape, which is rectangular in cross section and has a certain depth.

Recesses for locking (not shown) are made inside the hole 87 to engage with the protrusions 97 and fix the non-contact temperature sensor 92 inside the hole 87. The non-contact temperature sensor 92 is positioned in the hole 87 so that the front end 98 of the cover 91 is flush with the front surface of the plastic facing plate 50b.

The front recess 90 is in the shape of a truncated cone. The front recess 90 is opened toward the driver and the occupants and its bottom surface slopes down toward the vehicle compartment. The non-contact temperature sensor 92 is positioned in the back recess 90b and surrounded by the cover 91 so that the temperature-sensing window 94 comes to the bottom of the front recess 90. Thus, the angle θ of detecting range of 90° of the temperature detector 70F is secured.

The temperature detector 70F of the fourth embodiment has the following advantage in addition to the advantages of the foregoing embodiments of the present invention.

(12) Because the cover 91 has the protrusions 97 formed on the top, bottom, and right and left sides of the cover 91, and the hole 87 has the recesses to engage with the protrusions 97, the non-contact temperature sensor 92 is fixed in the hole 87 just by pushing the former into the latter.

Fifth Embodiment

Figure 16:
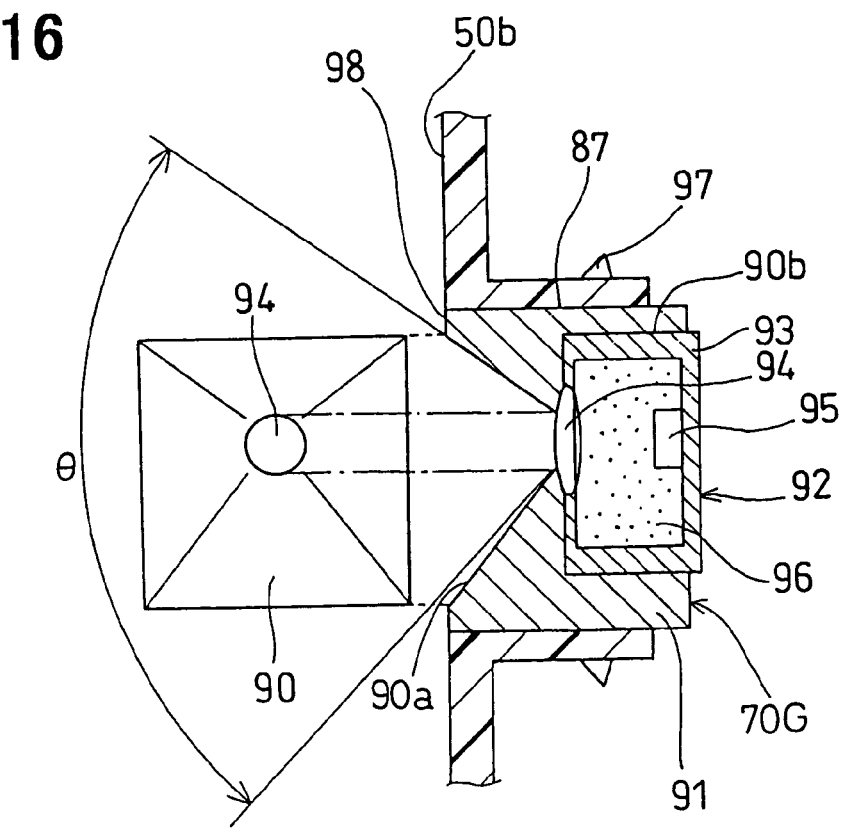
FIG. 16 is a sectional view of an instrument panel around another IR sensor, and a front view of the IR sensor according to a fifth embodiment of the present invention.

Referring to FIG. 16, the temperature detector 70G of the fifth embodiment of the present invention is now described.

The temperature detector 70G includes a cover (made of zinc alloy) 91 having a recess 90 formed on its front, and a non-contact temperature sensor 92. The temperature detector 70G is put in the hole 87, which is provided in the plastic facing plate 50b of the instrument panel 50 of the vehicle. The non-contact temperature sensor 92 of the temperature detector 70G has the same construction as the non-contact temperature sensor 92 of the temperature detector 70E as shown in FIG. 14.

The cover 91 is in the shape of a block, and has a pyramidal recess 90 in its front and another recess 90b in its back. The recesses 90 and 90b communicates with each other. The non-contact temperature sensor 92 is put in the back recess 90b. Protrusions 97 are also formed on the top, bottom, and right and left sides of the cover 91.

The hole 87 is rectangular in cross section and has a certain depth. Recesses (not shown) are made inside the hole 87 to engage with the protrusions 97 and fix the non-contact temperature sensor 92 inside the hole 87. The non-contact temperature sensor 92 is positioned in the hole 87 so that the front end 98 of the cover 91 is flush with the front surface of the plastic facing plate 50b.

The plastic facing plate 50b is fitted into the opening 50c made in the instrument panel 50 (see FIG. 14B) to be integral with the instrument panel 50. The hole 87 is positioned in a certain place on the facing plate 50b.

The front recess 90 has a pyramidal shape. The pyramidal front recess 90 is opened toward the driver and the occupants. Its bottom surface slopes down. The non-contact temperature sensor 92 is positioned in the back recess 90b that is surrounded by the cover 91 so that the temperature-sensing window 94 comes to the bottom of the pyramidal front recess 90. Thus, the angle θ of detecting range of 90° of the temperature detector 70G is secured.

The temperature detector 70G of the present embodiment has the following advantage in addition to the advantages of the foregoing embodiments of the present invention.

(13) Because of the pyramidal front recess 90 of the temperature detector 70G, the range of detecting the temperature of or around the driver and the occupants is square.

The present invention includes modifications other than the embodiments described above.

Figure 11:
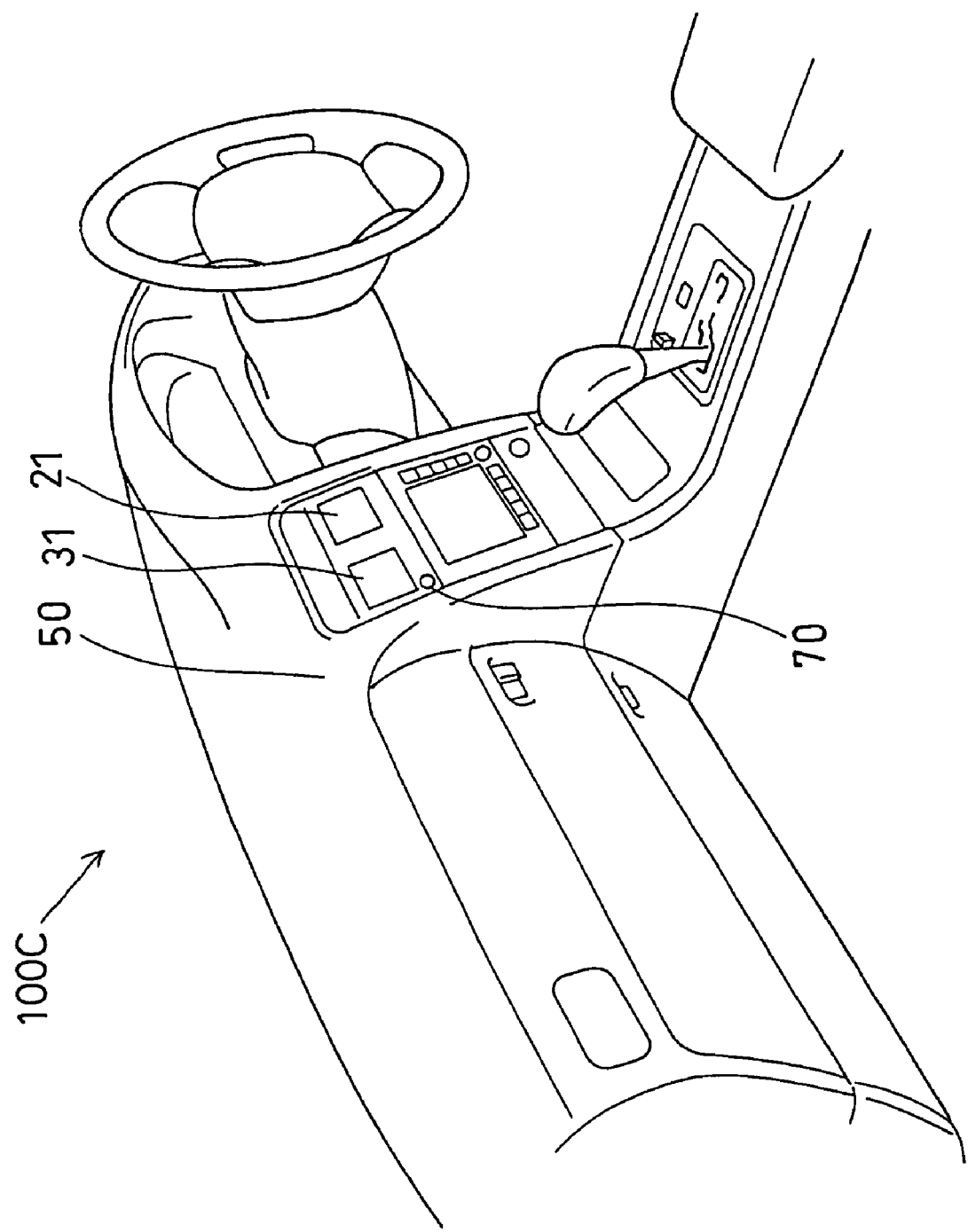
FIG. 11 is a perspective view of an instrument panel of a vehicle equipped with an automatic air conditioner according to a first modification of the present invention.

(i) As shown in FIG. 11, the IR sensor 70 may be disposed on the instrument panel 50, off the centerline of the vehicle compartment to the passenger seat.

In such an automatic air conditioner 100C of this first modification, when the driver operates the audio switches, the navigation switches, or the switches for adjusting the air volume and the temperature, he or she can avoid interfering with the detecting range of the IR Sensor 70. Besides, the influence of the operation of the steering wheel can be avoided.

Accordingly, the IR sensor 70 is capable of accurately detecting the temperature of or around the driver and the occupants, thereby enabling comfortable air conditioning.

(ii) Such configuration may be adopted as the temperature values detected by the IR sensor 70 at the present point in time or at a point in time preceding, by a certain time, the detection of the operation of one of the audio switches 82, the navigation switches 83, the blower switch 58, the DRIVER switch 62, and the PASSENGER switch 63 are maintained.

Figure 12:
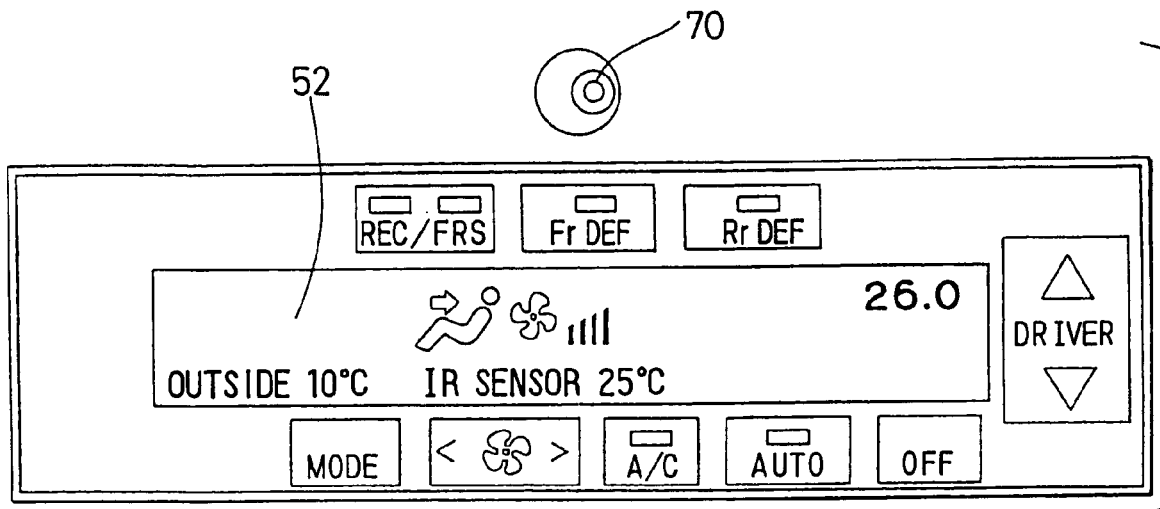
FIG. 12 is a front view of a control panel according to a second modification of the present invention.

(iii) As shown in FIG. 12, the temperature detected by the IR Sensor 70 and the air temperature outside the vehicle may be indicated on the LCD 52.

(iv) The truncated cone shape or pyramidal recess 90 for the non-contact temperature sensor 92 of the third, fourth, and fifth embodiments may be formed in a certain component, design, or pattern.

Figure 17:
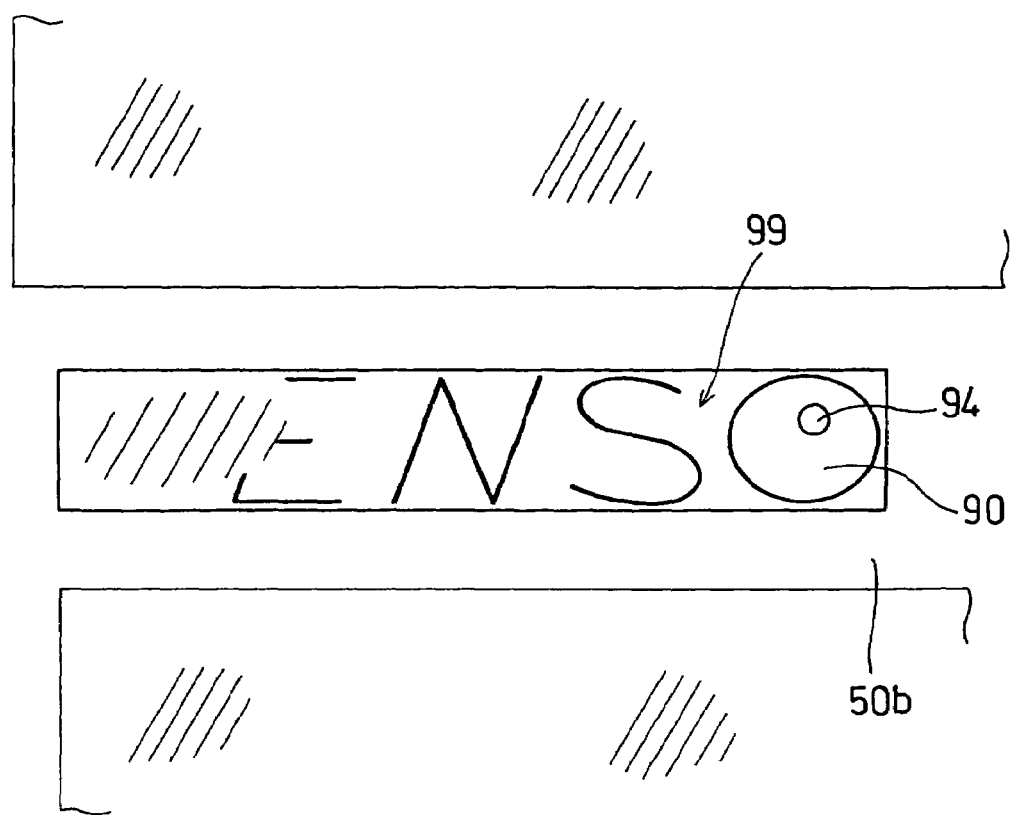
FIG. 17 is a front view of an instrument panel of another modification of the present invention.

For example, as shown in FIG. 17, the recess 90 may be formed in a letter 99. In such a case, the driver and the occupants recognize the recess 90 as a part of the letter 99 instead of recognizing the recess 90 as a recess. Thus, the interior looks more attractive.

(v) The recess 90 may be formed directly in the instrument panel 50 or a plastic facing plate 50b.

Sixth Embodiment

Figure 19:
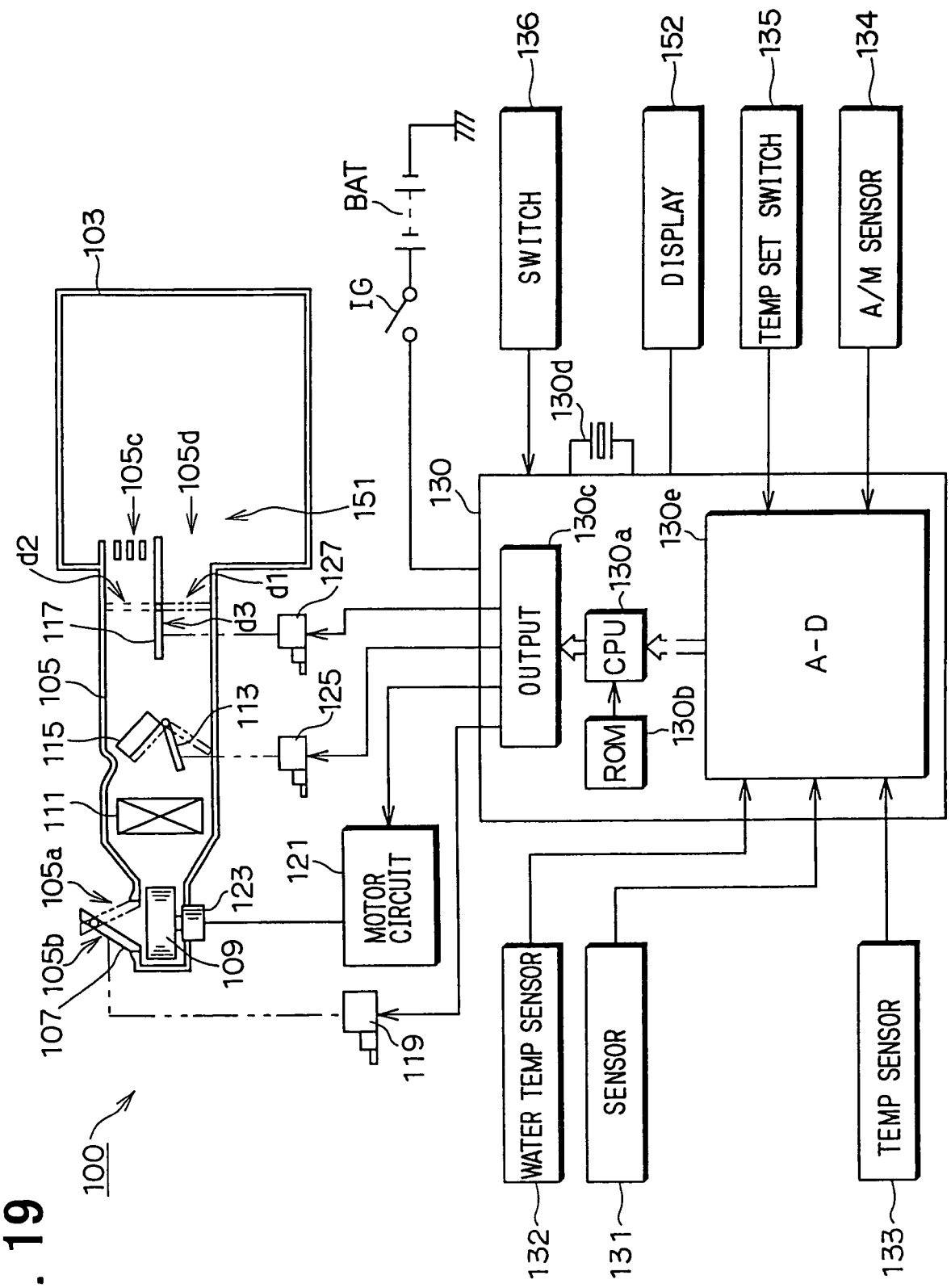
FIG. 19 is a schematic illustration of the whole configuration of an automatic air conditioner according to a sixth embodiment of the present invention.

As shown in FIG. 19, the automatic air conditioner 100 for vehicles of the present embodiment has an air conditioning unit 151 disposed in an air duct 105, which is disposed in front of the vehicle compartment 103. The air conditioning unit 151 has a suction mode switching damper 107 for the changeover between the inside air and the outside air, a blower 109, an evaporator (heat exchanger for cooling) 111, an air-mixing damper 113, a heater core (heat exchanger for heating) 115, and a blowout port switching damper 117 for changeover between blowout ports.

When the suction mode switching damper 107 is turned to its first position (shown in a solid line in FIG. 19) by a servomotor 119, it lets the air outside the vehicle flow into the air duct 105 through an outside-air intake port 105a. When the suction mode switching damper 107 is turned to its second position (shown in a broken line in FIG. 19) by the servomotor 119, it lets the air inside the vehicle compartment 103 (inside air) flow into the air duct 105 through an inside-air intake port 105b.

The blower 109 feeds the outside air taken in through the outside-air intake port 105a or the inside air taken in through the inside-air intake port 105b to the evaporator 111 according to the rotational speed of a blower motor 123, which is driven by a driving circuit 121. The evaporator 111 cools down the air fed from the blower 109 with a coolant circulated by the action of the cooling cycle of the automatic air conditioner 100.

The driving circuit 121 and the blower motor 123 make up a means for regulating the air volume of conditioned air into the vehicle compartment 103.

Then, the air-mixing damper 113 is directly driven by a servomotor 125. According to its opening degree, part of the cooled air from the evaporator 111 flows through the heater core 115, and the remaining cooled air flows toward the blowout port switching damper 117 by bypassing the heater core 115.

The air-mixing damper 113 and the servomotor 125 are included in means for regulating the temperature of conditioned air to be fed to the vehicle compartment 103.

When the automatic air conditioner 100 is put in its face mode, the damper 117 driven by a servomotor 127 is put in the first position (indicated as "d1" in FIG. 19) and lets the conditioned air flow through a face blowout port 105c of the air duct 105 toward the upper parts of bodies of the driver and the occupants in the vehicle compartment 103. The face blowout port 105c is formed in the facing plate 550 of a blowout port assembly 150 to be described later (see FIG. 20).

When the automatic air conditioner 100 is put in its foot mode, the damper 117 is put in the second position (indicated as "d2" in FIG. 19) and lets the conditioned air flow through a foot blowout port 105d of the air duct 105 toward the lower parts of bodies of the driver and the occupants in the vehicle compartment 103. When the automatic air conditioner 100 is put in its bi-level mode, the damper 117 is put in the third position (indicated as "d3" in FIG. 19) and lets the conditioned air flow through both the blowout ports 105c and 105d toward the bodies of the driver and the occupants.

The servomotor 119 to drive the damper 107, the driving circuit 121 to drive the blower 109, the servomotor 125 to drive the air-mixing damper 113, and the servomotor 127 to drive the damper 117 are controlled by an electrical control unit (ECU) 130.

The ECU 130 reads signals from a various elements, such as a non-contact infrared temperature sensor (hereinafter "IR sensor") 131, a water-temperature sensor 132, a post-evaporator air temperature sensor 133, an air-mix (A/M) opening-degree sensor 134, and a temperature-setting switch 135. The ECU 130 reads the signals via an A/D converter 130e. The IR sensor 131 detects a surface temperature Tir of a detecting range in the vehicle compartment 103. The water-temperature sensor 132 detects a temperature Tw of cooling water of the engine. The post-evaporator air temperature sensor 133 detects a temperature Te of the cooled air behind the evaporator 111. The A/M opening-degree sensor 134, which is built in the servomotor 125, detects an opening degree θ of the air-mixing damper 113. The temperature-setting switch 135 is used for setting the target in-vehicle compartment temperature Tset at a desired level. The switch 135 is operated by the driver or the occupant in the passenger seat. The ECU 130 is also connected to a display 152.

Figure 20:
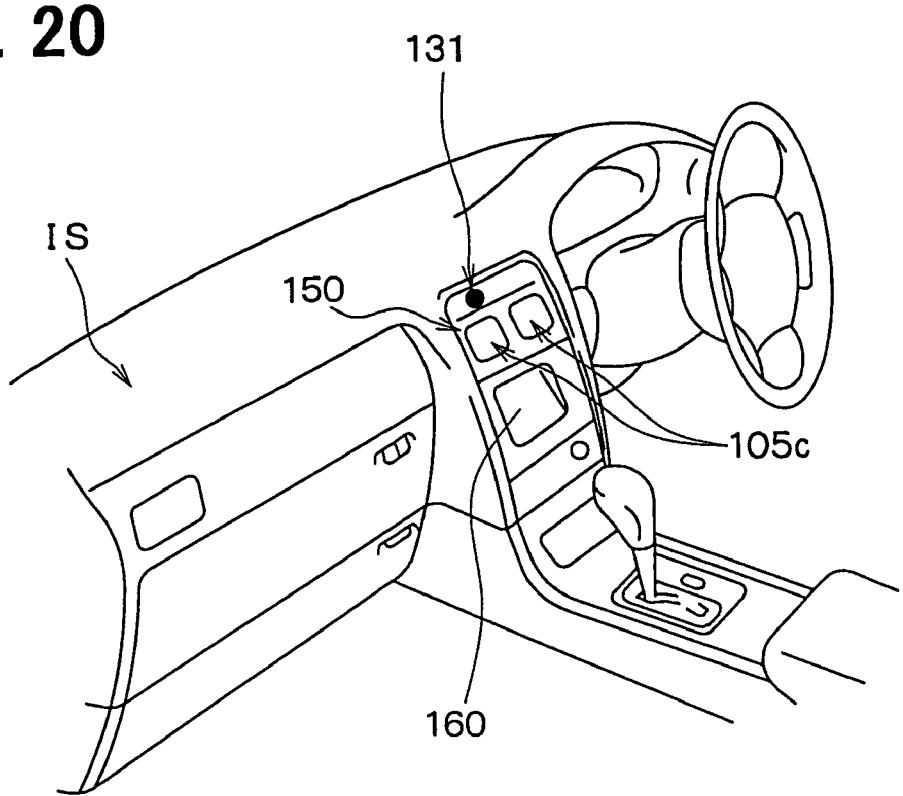
FIG. 20 is a perspective view of an instrument panel equipped with an automatic air conditioner with an IR sensor according to the sixth embodiment.

As shown in FIG. 20, an LCD control panel 160 with touch switches is provided. The LCD control panel 160 is a kind of a display. The LCD control panel is used for operating the automatic air conditioner 100, an audio, and a navigation system. The face blowout port 105c is disposed closer to the ceiling of the vehicle above the LCD control panel 160. The IR (infrared ray) sensor 131 is disposed above the face blowout port 105c. Accordingly, when the driver or the occupant in the passenger seat operates the touch switches on the LCD control panel 160, his or her hand or arm does not cover the IR sensor 131 inadvertently to disenable the IR sensor 131. Although it is preferable to dispose the IR sensor 131 above all the touch switches of the LCD control panel 160, the IR sensor 131 may be disposed above one of the touch switches.

Alternatively, the temperature-setting switch 135 may be of a type for the driver or the occupant in the passenger seat to input his or her feeling of heat or cold. In such a case, the ECU 130 determines the target in-vehicle compartment temperature Tset according to the input of the feeling of heat or cold.

Referring back to FIG. 19, the ECU 130 controls the automatic air conditioner 100 based on the above signals. The ECU 130 has a central processing unit (CPU) 130a, a ROM 130b, an output unit 130c, and a quartz resonator 130d. The CPU 130a receives the above signals through the A/D converter 130e to calculate amounts of manipulation of the above relevant devices, such as the driving circuit 121 and the servomotors 119, 123, 125, 127. The ROM 130b stores execution instructions of a flowchart to be described later. The output unit 130c outputs control signals corresponding to the amounts of manipulation calculated by the CPU 130a to the above relevant devices. The quartz resonator 130d sends out reference oscillation of several megahertz to make the CPU 130a do digital arithmetic processing of software.

When the ignition switch "IG" of the engine is turned on, the battery "BAT" of the vehicle begins to supply power to the ECU 130. Then, the ECU 130 begins to control air conditioning when an on/off switch 136 is turned on. The on/off switch 136 is used for turning on and off the automatic air conditioner 100.

The IR sensor 131 is now described in detail. The IR sensor 131 of the present embodiment is a non-contact temperature sensor to detect the temperature of a detecting range in the vehicle compartment. More specifically, the IR sensor 131 is an infrared sensor with a thermopile-type detecting element, which generates thermoelectromotive force in proportion in response to the intensity of incident infrared rays.

Referring back to FIG. 20, the IR sensor 131 is built in the blowout-port assembly 150, which is disposed in the middle of the instrument panel "IS".

Figure 21:
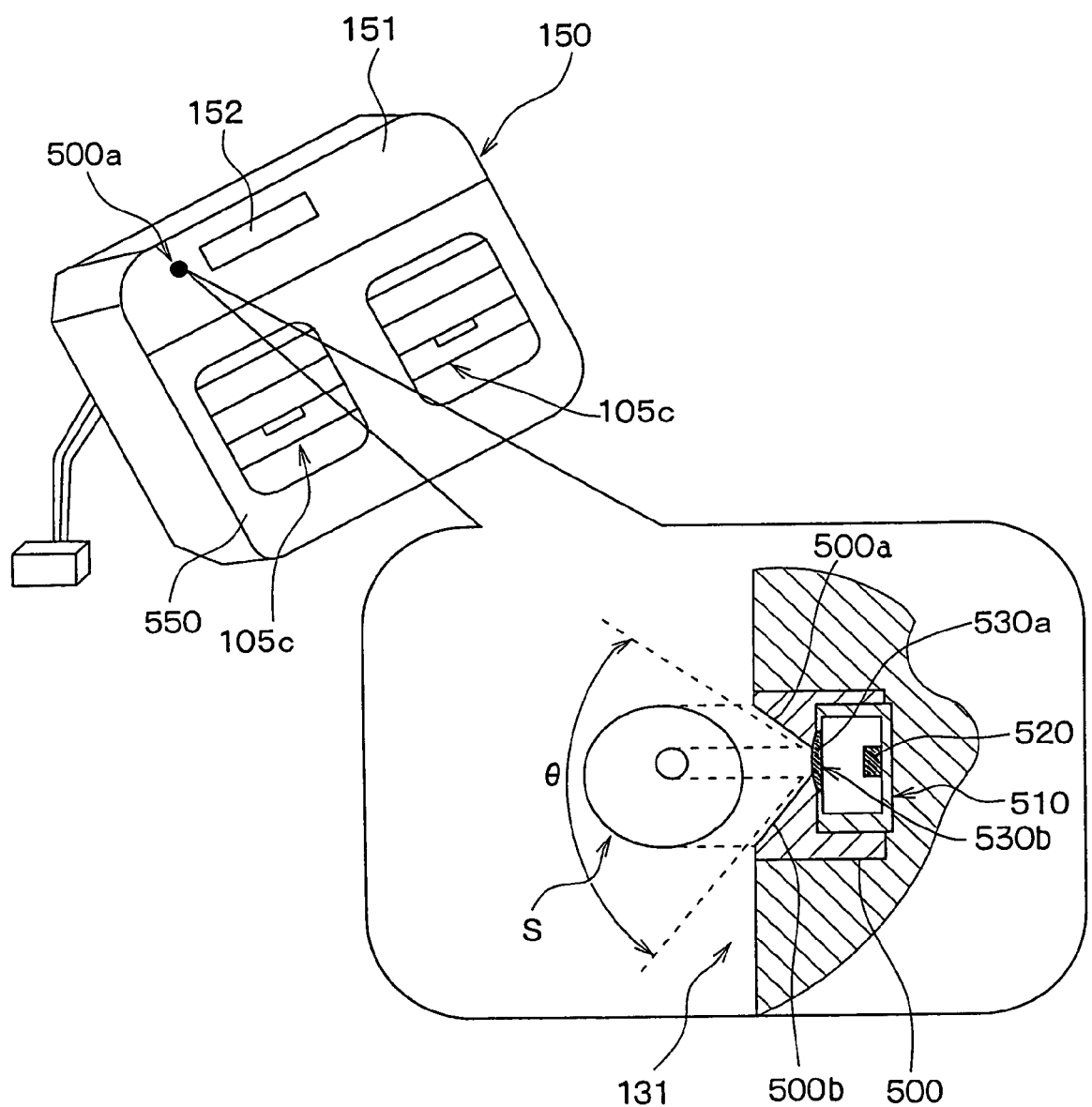
FIG. 21 is a perspective view of a blowout port assembly, a sectional view of the blowout port assembly, and a front view of the IR sensor according to the sixth embodiment.

Specifically, as shown in FIG. 21, the IR sensor 131 is positioned above the face blowout ports 105c of the blowout-port assembly 150 and embedded, or sunk, in the facing plate 550. More specifically, the IR sensor 131 is put in a recess 501 made in the instrument panel Is together with a cover 500. The cover 500 has a truncated cone shape recess 500a, and it is molded to cover a case 510 of the IR sensor 131.

The IR sensor 131 has the block-like cover 500, the case 510, and a thermocouple unit (detecting element) 520. The case 510 houses the thermocouple unit 520, and has a window 530b. The thermocouple unit 520 has a square shape when viewed from the front. The recess 500a is formed in the front of the block-like cover 500 to face toward the in-vehicle compartment. The recess 500 has a bottom surface 500b that slopes down toward the in-vehicle compartment. Another recess is also formed in the back. The bottom of the truncated cone shape front recess 500a is open to the back recess. Thus, the truncated cone shape front recess 500a and the back recess communicate with each other through the window 530b. The thermocouple unit 520 is disposed in the inner part of the case 510, which is put in the back recess of the block-like cover 500. The thermocouple unit 520 generates thermoelectromotive force corresponding to the temperature difference between its hot and cold junctions.

The case 510 has a window 530b overlapping the open bottom of the truncated cone shape front recess 500a of the block-like cover 500. The truncated cone shape front recess 500a is directed to the temperature-detecting range in the vehicle compartment. Thus, the window 530b of the case 510 is directed to the temperature-detecting range in the vehicle compartment through the truncated cone shape front recess 500a.

The window 530b of the case 510 is fitted with a lens 530a, through which incident infrared rays pass. The infrared rays passing through the lens 530a are converted into heat by infrared-absorbing film (not shown). The heat causes temperature difference between the hot and cold junctions of the thermocouple unit 520.

By determining the size of the thermocouple unit 520, the size of the window 530b of the case 510, and the distance between the thermocouple unit 520 and the window 530b appropriately, an appropriate angle "θ" of temperature-detecting range can be achieved. The height of the IR sensor 131 is generally the same as the height of the abdomen or the chest of the driver. The reference letter "S" of FIG. 21 is a front view of the truncated cone shape front recess 500a of the IR sensor 131 and the lens 530a. The display 152 is provided on the blowout port assembly to indicate the detected value of the IR sensor 131 and so on.

Figure 22:
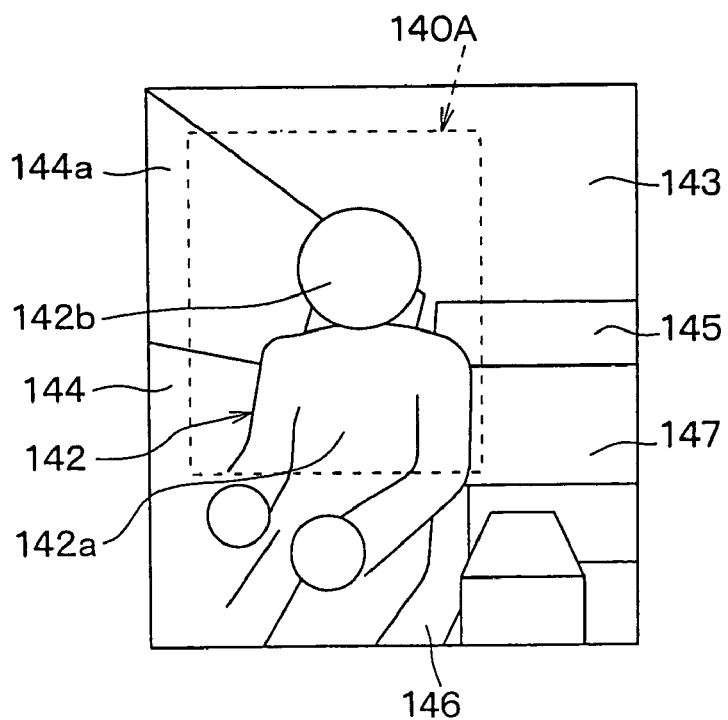
FIG. 22 is an illustration of a temperature detecting range of the IR sensor according to the sixth embodiment.

FIG. 22 shows the detecting range 140A of the IR sensor 131. The IR sensor 131 is directed to the driver 142, off the centerline of the vehicle compartment and a little up off the horizon. The angle "θ" of the detecting range of the IR sensor 131 is determined appropriately to detect the temperature of surfaces of objects in the detecting range 140A shown by the dotted line.

The detecting range 140A covers the upper half of the body 142a of the driver 142 (the part covered with the clothes), the head 142b of the driver, part of the ceiling 143, part of the side window 144a of the door 144 beside the driver, and part of the rear window 145. In FIG. 22, the reference numerals 146 and 147 are the driver' seat and the rear seat, respectively.

Because the ceiling 143 is not exposed to sunlight and is provided with an insulating material, its temperature generally follows the air temperature in the vehicle compartment. The glass temperature of the side window 144a and the rear window 145 are changed under the influence of the inside and outside air temperature. The surface temperature of the upper half of the driver's body 142a is changed under the influence of sunlight. As a result, the IR sensor 131 measures the temperature of the detecting range 140A based on the inside and outside air temperatures and environmental data including the intensity of sunshine.

Besides, because the temperature of the driver's and rear seats 146 and 147 are also changed under the influence of sunlight, the seats 146 and 147 may be included in the detecting range 140A.

Figure 23:
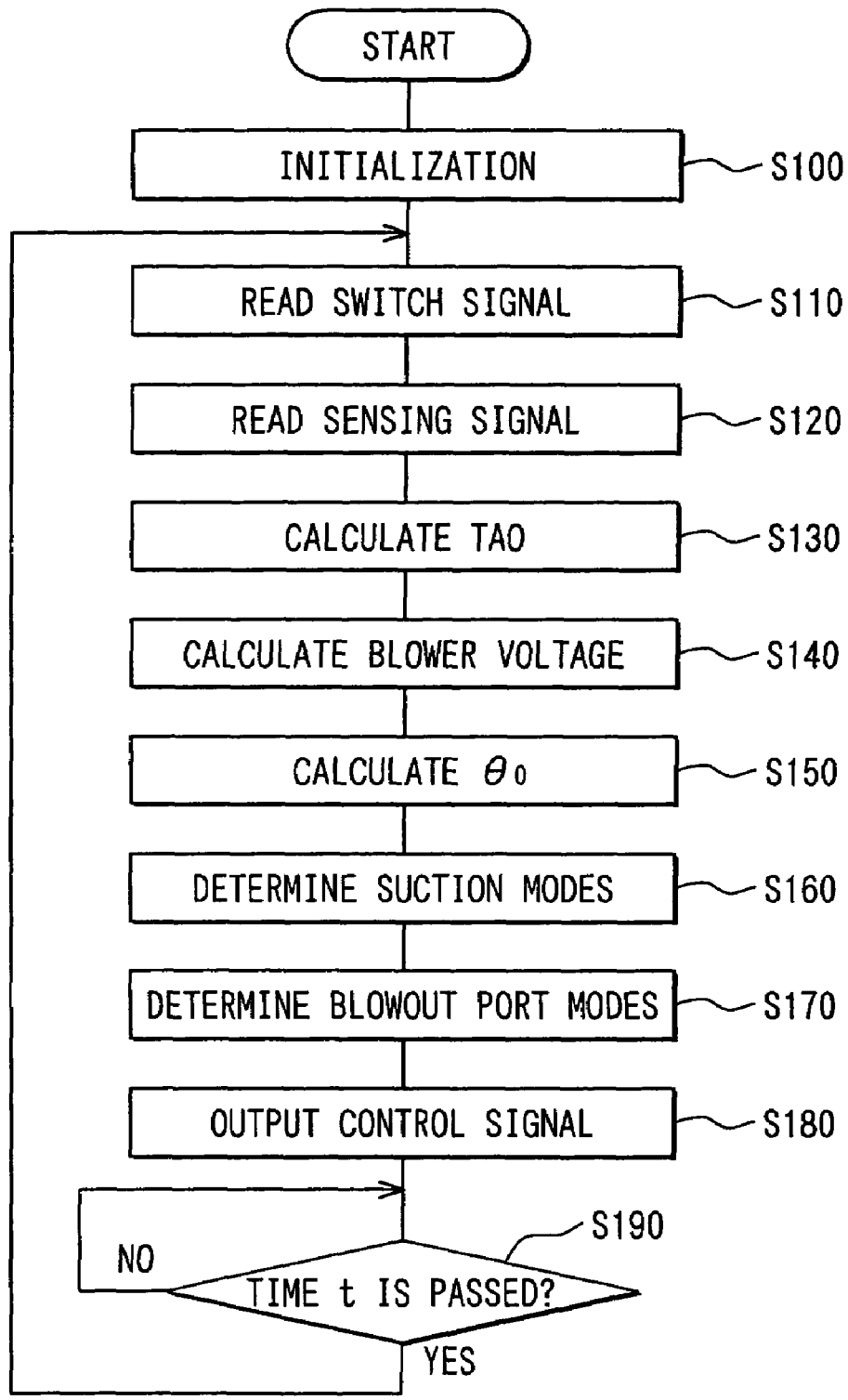
FIG. 23 is a flowchart of a control program carried out by an ECU according to the sixth embodiment.

Referring to the flowchart of FIG. 23, the operation of the automatic air conditioner 100 of the present embodiment is now described. The flowchart shows the control process that is carried out by the ECU 130. The ECU 130 executes a control program stored in the ROM 130b according to the flowchart of FIG. 23.

In step S100, counters, flags are initialized. The counters and the flags are used in the processing. Then, in step S110, the set temperature Tset inputted through the temperature-setting switch 135 is read into the CPU 130a. In step S120, the temperature Tir detected by the IR sensor 131 and the signals of the sensors 132 to 134 are read into the CPU 130a. In this embodiment, steps S110 and S120 are included in means for inputting detected signals.

In next step S130, a target blowout temperature (hereinafter, "TAO") is calculated based on the set temperature Tset and the temperature Tir read in step S120 by using the equation (#9), which is stored in the ROM 130b in advance.

$$TAO = Kset \times Tset - Kir \times Tir + C \quad (\#9)$$

where "Kset" and "Kir" are coefficients, and "C" is a constant.

Figure 24:
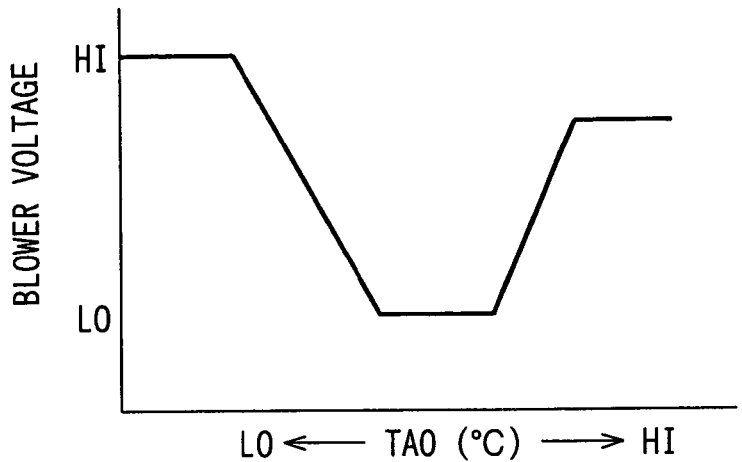
FIG. 24 is a characteristic graph showing a relation between a TAO and a blower control voltage according to the sixth embodiment.

In step S140, the voltage to be applied to the blower motor 123 (blower voltage) corresponding to the target air volume is determined based on the TAO acquired in step S130 and the characteristic graph of FIG. 24 stored in the ROM 130b.

In step S150, the target opening degree θo of the air-mixing damper 113 is calculated from the TAO acquired in step S130 and the temperature of cooling water of the engine Tw and the air temperature Te behind the evaporator 111 both acquired in step S120 by using the equation (#10).

$$\theta o = \{(TAO - Te)/(Tw - Te)\} \times 100 \ (\%) \quad (\#10)$$

Figure 25:
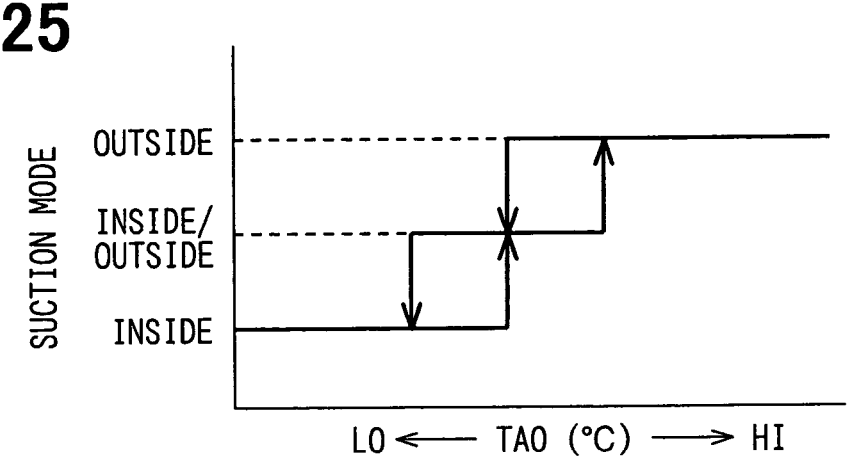
FIG. 25 is a characteristic graph showing a relation between the TAO and a suction mode according to the sixth embodiment.

In step S160, it is determined a suction mode whether inside air, outside air, or both (semi-inside air) is sucked based on the target blowout temperature TAO and the characteristic graph of FIG. 25 stored in the ROM 130b.

Figure 26:
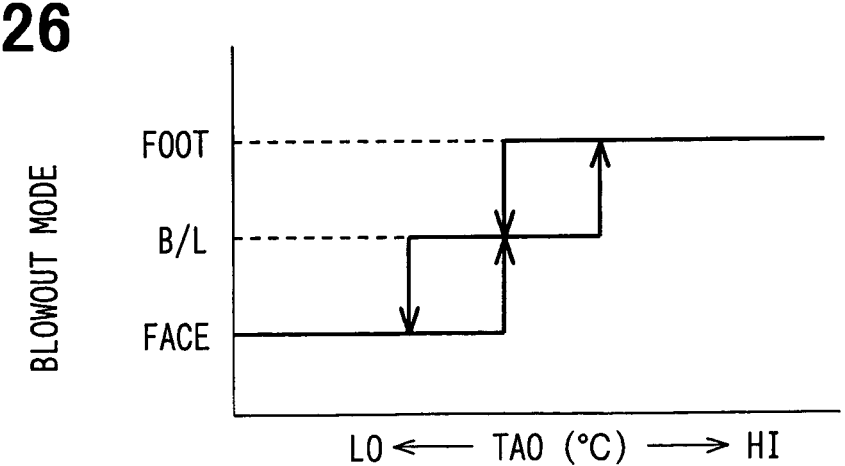
FIG. 26 is a characteristic graph showing a relation between the TAO and a blowout port mode according to the sixth embodiment.

In step S170, a blowout port mode is chosen from among a face mode (FACE), a bi-level mode (B/L) and a foot mode (FOOT) based on the TAO and the characteristic graph of FIG. 26 stored in the ROM 130b.

In step S180, according to calculated results in the above steps S140 to S170, control signals for the blower voltage, the opening degree of the air-mixing damper, the inside/outside air suction mode and the blowout port mode are outputted to the driving circuit 121, the servomotor 125, the servomotor 119, and a servomotor 127, respectively.

Then, the process advances to step S190. In step S190, it is determined whether a t-second period has passed or not. When it is determined to "NO", the process stays in step S190. When it is determined to "YES", the process returns to step S110.

As the air conditioning process is conducted in such a way, when the blower 109 feeds the outside air taken in through the outside-air intake port 105a or the inside air taken in through the inside-air intake port 105b to the evaporator 111 in the air duct 105, the evaporator 111 cools down the air fed from the blower 109.

An air-mixing damper 113 allows part of the cooled air from the evaporator 111 to flow into the heater core 115, and the remaining cooled air to bypass the heater core 115.

Then, the cooled air bypassing the heater core 115 and the air flowing into the heater core 115 are mixed at upstream of the blowout port switching damper 117. Further, corresponding to the switching position of the damper 117, the mixed air flows into one of the foot blowout ports 105d and the face blowout port 105c.

Thus, the air inside or outside the vehicle compartment is cooled (or warmed), and then the air blows into the vehicle compartment through one of the foot blowout ports 105d and the face blowout port 105c.

Now, effects of the present embodiment will be described. The air conditioner for vehicles of the present embodiment includes the air conditioning unit 151, the IR sensor 131, and the ECU 30. The IR sensor 131 is disposed above the face blowout port 105c.

The air conditioning unit 151 regulates the air temperature and feeds the conditioned air into the vehicle compartment through one of the face blowout port 105c, the foot blowout port 105d, and both. The IR sensor 131 senses the surface temperature of a temperature-detecting range in the vehicle compartment without contacting. The ECU 130 controls the air conditioning unit 151 according to the temperature sensed by the IR sensor 131 so that the air conditioning unit 51 can regulate the air temperature and feed the conditioned air through the face blowout port 105c and the foot blowout port.

For example, when the air is cooled down, the cooled air flows in a downward direction from the face blowout port 105c. In such a situation, if the IR sensor 131 is disposed below the face blowout port 105c, the facing plate of the blowout-port assembly 150 is cooled. In addition, when the instrument panel Is is molded with a thermally insulating material, the back side of the blowout-port assembly 150 is thermally insulated by the instrument panel Is. In such a situation, an uneven distribution of temperature at the blowout-port assembly 150 and also at the IR sensor 131 is existed.

Accordingly, regardless of incident infrared rays from the temperature-detecting range, there occurs difference in temperature between the hot and cold junctions of the thermocouple unit 520. Therefore, the thermocouple unit 520 generates thermoelectromotive force including detection error corresponding to the temperature difference between its hot and cold junctions.

On the other hand, according to the present embodiment, the IR sensor 131 is disposed above the face blowout-port 105c. Therefore, the IR sensor 131 is hardly affected by the cooled airflow blown out of the face blowout-port 105c. The voltage outputted by the IR sensor 131 shows the surface temperature of the temperature-detecting range as accurate. Since the ECU 130 carries out the air-conditioning control based on the voltage outputted by the IR sensor 131, the air in the vehicle compartment is desirably air-conditioned. The air-conditioning control means here is to control the temperature and the air volume of the conditioned air, which is flowed through the blowout ports 150c and 150d.

According to the present embodiment, the IR sensor 131 detects the surface temperatures of the ceiling 143, the side window 144a, the rear window 145, and the upper half of the driver's body. The surface temperature of the ceiling 143 is varied generally according to the air temperature of the vehicle compartment. The surface temperature of the side window 144a and the rear window 145 is varied under the influence of the outside air temperature. That of the upper half of the driver's body 142a is varied under the influence of sunlight. Accordingly, the IR sensor 131 measures the surface temperatures within the detecting range based on the inside and outside air temperatures and environmental data including the intensity of sunshine.

Thus, since it is possible to properly control the compartment temperature based on the inside and outside air temperatures and the intensity of sunshine, while preventing the reduction in controllability of the compartment temperature, costs for the sensors and for assembling the sensors can be reduced by getting rid of the sensors for inside and outside air temperatures and for the intensity of sunshine.

Further, according to the present invention, the IR sensor 131 is built in the blowout port assembly 150 and embedded or sunk in the facing plate 550 as shown in FIG. 21. Therefore, even when the airflow is directed in an upward direction by an airflow direction regulation plate disposed at the face blowout port 105c, the IR sensor 131 is hardly affected by the temperature of the airflow.

Since the IR sensor 131 is built in the blowout port assembly 150 and embedded or sunk in the facing plate 550, the sunlight outside the vehicle compartment is prevented from directly entering and causing unreliable measurement of temperature.

As described above, the IR sensor 131 is disposed in the blowout port assembly 150 of the instrument panel Is. Therefore, when the ECU 130 is placed in the instrument panel Is, connection wires between the ECU 130 and the IR sensor 131 can be short compared to the case of placing the IR sensor 131 at other positions, such as the one near a room mirror of the ceiling. This cuts down on costs and reduces influences from electric noises such as electronic waves.

Figure 27:
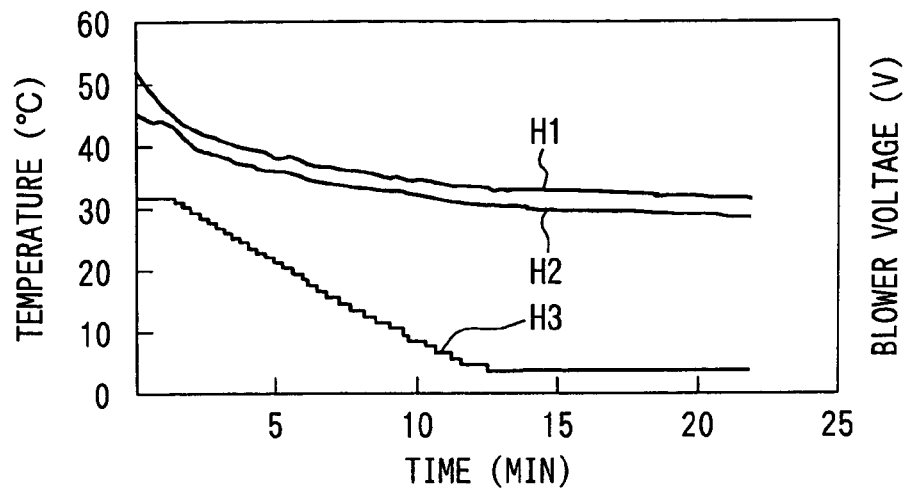
FIG. 27 shows an experimental result of the air conditioner according to the sixth embodiment.
Figure 28:
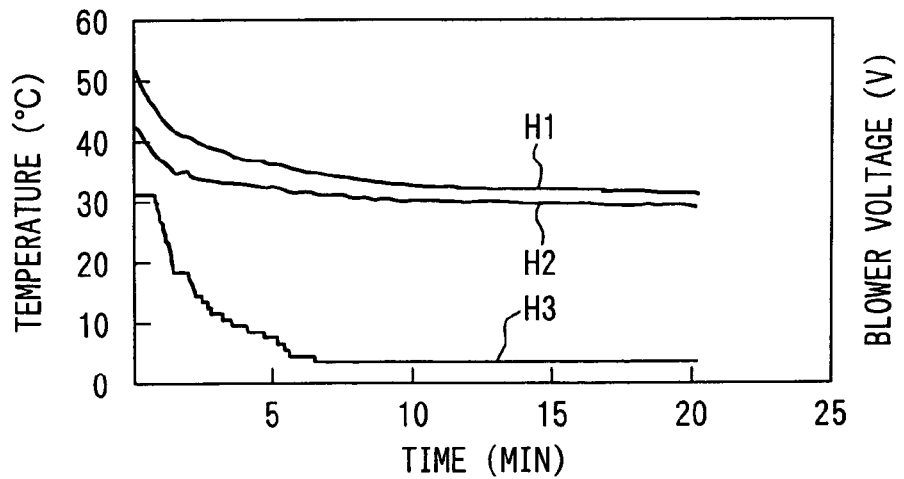
FIG. 28 shows an experimental result of an air conditioner according to a related art.

According to experimental results in FIGS. 27, 28, operations of the air conditioner of the present embodiment is explained in comparison with a conventional air conditioner for vehicles. The conventional air conditioner has an IR sensor disposed below a face blowout port.

In FIGS. 27 and 28, the horizontal axis shows time (minutes), and the vertical axis shows temperature (° C.) and voltage (volt). A line H1 shows a temperature around a driver such as a face, knees, and a waist of a driver. A line H2 shows an average value of temperatures detected by the IR sensor 131 (for example, an average value of four detected temperatures). A line H3 shows a blower voltage applied to the blower motor 123. The lines H1 to H3 of FIG. 27 show experimental results of the air conditioner for vehicles of the present embodiment. The lines H1 to H3 of FIG. 28 show experimental results of the conventional air conditioner.

According to the experimental results of FIGS. 27 and 28, the blower voltage corresponding to the line H3 in the present embodiment of the present invention is smoothly reduced as temperatures of the face, knees and waist of the driver decrease in comparison with the conventional air conditioner shown in FIG. 28. That is, the blower voltage, namely, the air volume of the air fed through the blowout ports decreases smoothly in accordance with the driver's feeling of heat or cold.

In other words, when cooling down, a transient period and a stationary state are properly switched in accordance with the driver's feeling of heat or cold. The transient period is when air temperature of the vehicle compartment decreases. The stationary state is when the air temperature of the vehicle compartment is stabilized. Therefore, the air in the vehicle compartment is desirably controlled for the driver.

Seventh Embodiment

Figure 29:
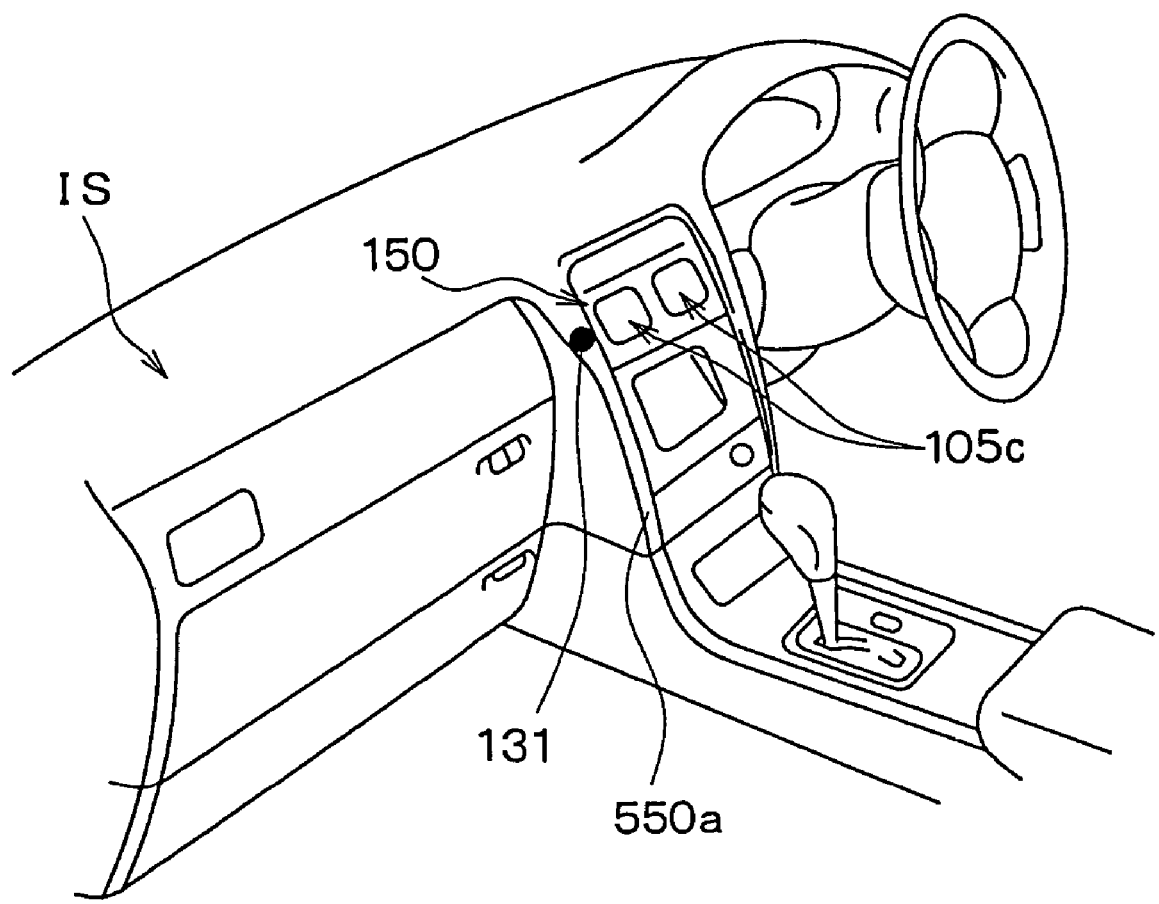
FIG. 29 is a perspective view of an instrument panel equipped with an automatic air conditioner with another IR sensor according to a seventh embodiment of the present invention.

In the sixth embodiment, the IR sensor 131 is disposed above the face blowout port 105c. Instead, in the seventh embodiment, the IR sensor 131 is disposed beside the face blowout port 105c as shown in FIG. 29. The IR sensor 131 is disposed in the instrument panel Is and embedded or sunk in the facing plate 550a similarly to the sixth embodiment.

In such a location of the IR sensor 131, since the air fed through the face blowout port 105c flows in a downward direction, the IR sensor 131 is hardly affected by the temperature of the airflow. Further, even when the airflow is directed sideways by the airflow direction regulation plate of the face blowout port 105c, the IR sensor 131 is hardly affected by the temperature of the air flow because the IR sensor 131 is disposed in the instrument panel Is to be embedded or sunk in the facing plate 550a.

Figure 30:
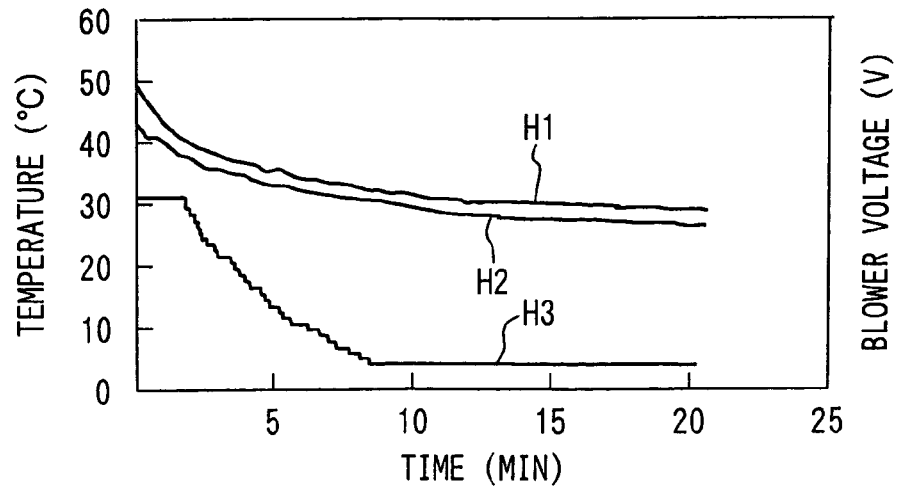
FIG. 30 shows an experimental result of the air conditioner according to the seventh embodiment.

The experimental results of the air conditioner for vehicles of the seventh embodiment are shown in FIG. 30. In FIG. 30, the horizontal axis shows time (minutes), and the vertical axis shows temperature (° C.) and voltage (volt). The line H1 shows temperatures of a face, knees and a waist of a driver. The line H2 shows an average value of temperatures detected by the IR sensor 131 (for example, an average value of four detected temperatures). The line H3 shows the blower voltage applied to the blower motor 123.

According to the experimental results of FIG. 30, as in the above sixth embodiment, the blower voltage in the seventh embodiment is smoothly reduced as temperatures at the face, knees and waist of the driver decrease in comparison with the conventional air conditioner shown in FIG. 28. Further, during the cooling, the transient period and the stationary state are properly switched in accordance with the driver's feeling of heat or cold. The transient period is when air temperature of the vehicle compartment decreases. The stationary state is when the air temperature of the vehicle compartment is stabilized. Therefore, the air in the vehicle compartment is desirably controlled for the driver.

OTHER MODIFICATIONS

The present invention should not be limited to the embodiments discussed above and shown in the figures, but may be implemented in various ways without departing from the spirit of the invention. For example, in the sixth and seventh embodiments, the thermopile-type infrared sensor 131 is used as the non-contact temperature sensor. However, any temperature sensors may be used so long as they show detection errors when the sensor is affected by the temperature of the cooled airflow.

In the embodiments, the air conditioner for vehicles has a cooling mode and a heating mode, and the modes are switched. Instead of it, however, an air conditioner exclusively used for cooling may be adopted.

The IR sensor is preferably disposed above the face blowout port and the switches, such as the temperature-setting switch on the LCD.

What is claimed is:

1. A vehicle air conditioner for a vehicle, the vehicle having an instrument panel on which at least one of a temperature-setting switch, an air volume-setting switch, an audio switch, and a navigation switch is disposed, the vehicle air conditioner comprising:

a non-contact temperature sensor that detects a temperature of inside air of the vehicle;

a control unit that controls a temperature of conditioned air flowing into a vehicle compartment based on the temperature detected by the non-contact temperature sensor, and a memory that stores a plurality of detection values detected by the non-contact temperature sensor; wherein the non-contact temperature sensor is disposed on the instrument panel so that the non-contact temperature sensor is disposed above at least one of the temperature-setting switch, the air volume-setting switch, the audio switch, and the navigation switch; and upon detecting an operation of one of the temperature-setting switch, the air volume-setting switch, the audio switch, and the navigation switch, the control unit controls the temperature of the conditioned air based on the detection values that is an average of the plurality of detection values stored in the memory.

2. The vehicle air conditioner according to claim 1, wherein the non-contact temperature sensor is disposed above the temperature-setting switch and the air volume-setting switch.

3. The vehicle air conditioner according to claim 1, wherein the non-contact temperature sensor is positioned off a centerline of the vehicle toward a passenger seat.

4. The vehicle air conditioner according to claim 1, wherein the non-contact temperature sensor is an infrared temperature sensor, and a sign of the infrared temperature sensor is placed on one side of the infrared temperature sensor to indicate its existence.

5. The vehicle air conditioner according to claim 1, wherein the instrument panel has a front recess in a shape of one of a cone and a pyramid, and has a temperature-sensing window positioned at the bottom of the front recess.

6. The vehicle air conditioner according to claim 5, wherein the front recess is opened toward the vehicle compartment so that the front recess has a bottom surface sloping down toward the vehicle compartment.

7. The vehicle air conditioner according to claim 5, wherein the front recess is directly formed in a facing plate that is a part of the instrument panel.

8. The vehicle air conditioner according to claim 5, wherein the non-contact temperature sensor includes:

a temperature sensing element that has a thermocouple;

a sensor container that houses the temperature sensing element;

wherein the temperature-sensing window has a lens and a filter that is disposed at front side of the sensor container, and the thermocouple is disposed in an inner part of the sensor container.

9. The vehicle air conditioner according to claim 5, wherein the instrument panel has a facing plate that has a hole in which the non-contact temperature sensor is disposed.

* * * * *